US011158334B2

(12) United States Patent
Hiroe

(10) Patent No.: US 11,158,334 B2
(45) Date of Patent: Oct. 26, 2021

(54) SOUND SOURCE DIRECTION ESTIMATION DEVICE, SOUND SOURCE DIRECTION ESTIMATION METHOD, AND PROGRAM

(71) Applicant: SONY CORPORATION, Tokyo (JP)

(72) Inventor: Atsuo Hiroe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/982,954

(22) PCT Filed: Jan. 28, 2019

(86) PCT No.: PCT/JP2019/002811
§ 371 (c)(1),
(2) Date: Sep. 21, 2020

(87) PCT Pub. No.: WO2019/187589
PCT Pub. Date: Oct. 3, 2019

(65) Prior Publication Data
US 2021/0020190 A1 Jan. 21, 2021

(30) Foreign Application Priority Data
Mar. 29, 2018 (JP) .............................. JP2018-064439

(51) Int. Cl.
*G10L 25/51* (2013.01)
*H04R 1/40* (2006.01)
(52) U.S. Cl.
CPC .............. *G10L 25/51* (2013.01); *H04R 1/406* (2013.01)
(58) Field of Classification Search
CPC ....... G01S 3/80; G10L 21/0308; G10L 25/30; G10L 25/51; G10L 2021/02166;
(Continued)

(56) References Cited

U.S. PATENT DOCUMENTS 6,222,927 B1 * 4/2001 Feng .................... H04R 25/407
381/92
8,761,410 B1 * 6/2014 Avendano ............. H04M 9/085
381/66
(Continued)

FOREIGN PATENT DOCUMENTS

JP 2007-198977 A 8/2007
JP 4964259 B2 6/2012
(Continued)

OTHER PUBLICATIONS

Xiao, et al., "A learning-based Approach to Direction of arrival Estimation in Noisy and Reverberant Environments", International Conference on Acoustics, Speech and Signal Processing (ICASSP), IEEE, Aug. 6, 2015, pp. 2814-2818.
(Continued)

*Primary Examiner* — Lun-See Lao
(74) *Attorney, Agent, or Firm* — Chip Law Group

(57) ABSTRACT

In a case where two microphones are used, sound source direction estimation of a plurality of sound sources can be performed with high accuracy. For this purpose, an inter-microphone phase difference is calculated for every frequency band in a microphone pair including two microphones that are installed apart from each other by a predetermined distance. Furthermore, for every frequency band in the microphone pair, a single sound source mask indicating whether or not a component of the frequency band is a single sound source is calculated. Then, the calculated inter-microphone phase difference and the calculated single sound source mask are input as feature quantities to a multi-label classifier, and a direction label associated with a sound source direction is output to the feature quantities.

14 Claims, 21 Drawing Sheets

RELATIONSHIP BETWEEN SOUND SOURCE DIRECTION AND PATH DIFFERENCE

(58) Field of Classification Search
CPC ............... G10L 21/028; G10L 21/0232; G10L 21/0272; G10L 25/48; G10L 15/20; G10L 2021/02165; G10L 25/78; G10L 25/87; G10L 2021/02082; G10L 21/0208; G10L 25/18; G10L 25/81; H04R 1/406; H04R 2430/21; H04R 3/005; H04R 2201/403; H04R 2227/003; H04R 2227/009; H04R 2410/05; H04R 2430/03; H04R 2430/20; H04R 2499/13; H04R 27/00; H04R 2225/41; H04R 2225/43; H04R 2225/55; H04R 2460/01; H04R 25/405; H04R 25/407; H04R 25/505; H04R 25/552; H04R 25/554; H04R 25/70; H04L 67/12; H04L 67/22; H04W 4/21; G10K 11/17823; G10K 11/1783; G10K 11/17837; G10K 11/17854; G10K 11/17857; G10K 11/17881; G10K 11/17885; G10K 2210/1053; G10K 2210/1081; G10K 2210/3014; G10K 2210/51; G10K 15/00; H04B 3/20; H04H 20/49; H04M 9/085; H04S 1/005; H04S 2420/01
USPC .......... 381/92, 74, 1, 94.1–94, 4, 17, 18, 300
See application file for complete search history.

(56) References Cited

U.S. PATENT DOCUMENTS

| | | | |
|---|---|---|---|
| 9,008,329 B1* | 4/2015 | Mandel | ................. G10K 15/00 381/94.2 |
| 9,378,754 B1* | 6/2016 | Every | ................. G10L 21/0208 |
| 2010/0296668 A1* | 11/2010 | Lee | ................. G10K 11/17854 381/94.7 |
| 2014/0044279 A1* | 2/2014 | Kim | ................. G10L 21/0272 381/92 |

FOREIGN PATENT DOCUMENTS

| | | |
|---|---|---|
| JP | 2013-238520 A | 11/2013 |
| WO | 2013/172427 A1 | 11/2013 |

OTHER PUBLICATIONS

Read, et al., "Deep Learning for Multi-label Classification", arXiv, Computer Science, Dec. 17, 2014, 08 pages.

Adavanne, et al., "Direction of Arrival Estimation for Multiple Sound sources using Convolutional Recurrent Neural Network", Conference: European Signal Processing Conference (EUSICO), Oct. 27, 2017, 05 pages.

Takeda, et al., "Discriminative Multiple Sound source Localization based on Deep Neural Networks using Independent Location Model", Spoken Language Technology Workshop (SLT), IEEE, Dec. 16, 2016, pp. 603-609.

Mohan, et al., "Localization of Multiple Acoustic Sources with Small Arrays using a Coherence Test", The Journal of the Acoustical Society of America, vol. 123, No. 4, Apr. 2008, pp. 2136-2147.

Tsoumakas, et al., "Mining Multi-label Data", Data Mining and Knowledge Discovery Handbook, Jul. 7, 2010, pp. 667-685.

Mandel, et al., "Model-Based Expectation-Maximization Source Separation and Localization", Transactions on Audio, Speech, and Language Processing, IEEE, vol. 18, No. 2, Feb. 2010, pp. 382-394.

Takeda, et al., "Sound source localization based on Deep Neural networks with Directional Activate Function Exploiting Phase Information", International Conference on Acoustics, Speech and Signal Processing (ICASSP), IEEE, Mar. 23, 2016, 405-409 pages.

Zheng, et al., "Spectral mask Estimation using Deep Neural Networks for Inter-Sensor Data Ratio Model based Robust DOA Estimation", International Conference on Acoustics, Speech and Signal Processing (ICASSP), IEEE, Aug. 6, 2015, pp. 325-329.

Tsoumakas, et al., "Mining Multi-label Data", Data Mining and Knowledge Discovery Handbook, Ed. Maimon, et al., Springer, 2nd edition, Jul. 7, 2010, pp. 667-685.

International Search Report and Written Opinion of PCT Application No. PCT/JP2019/002811, dated Apr. 2, 2019, 06 pages of ISRWO.

* cited by examiner

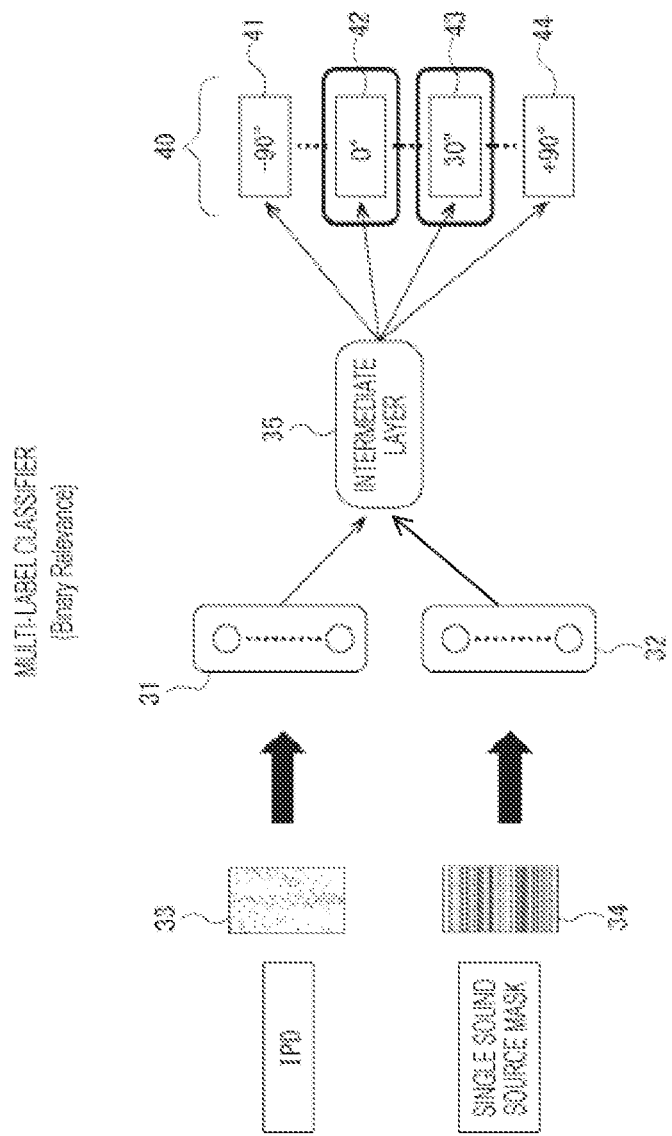

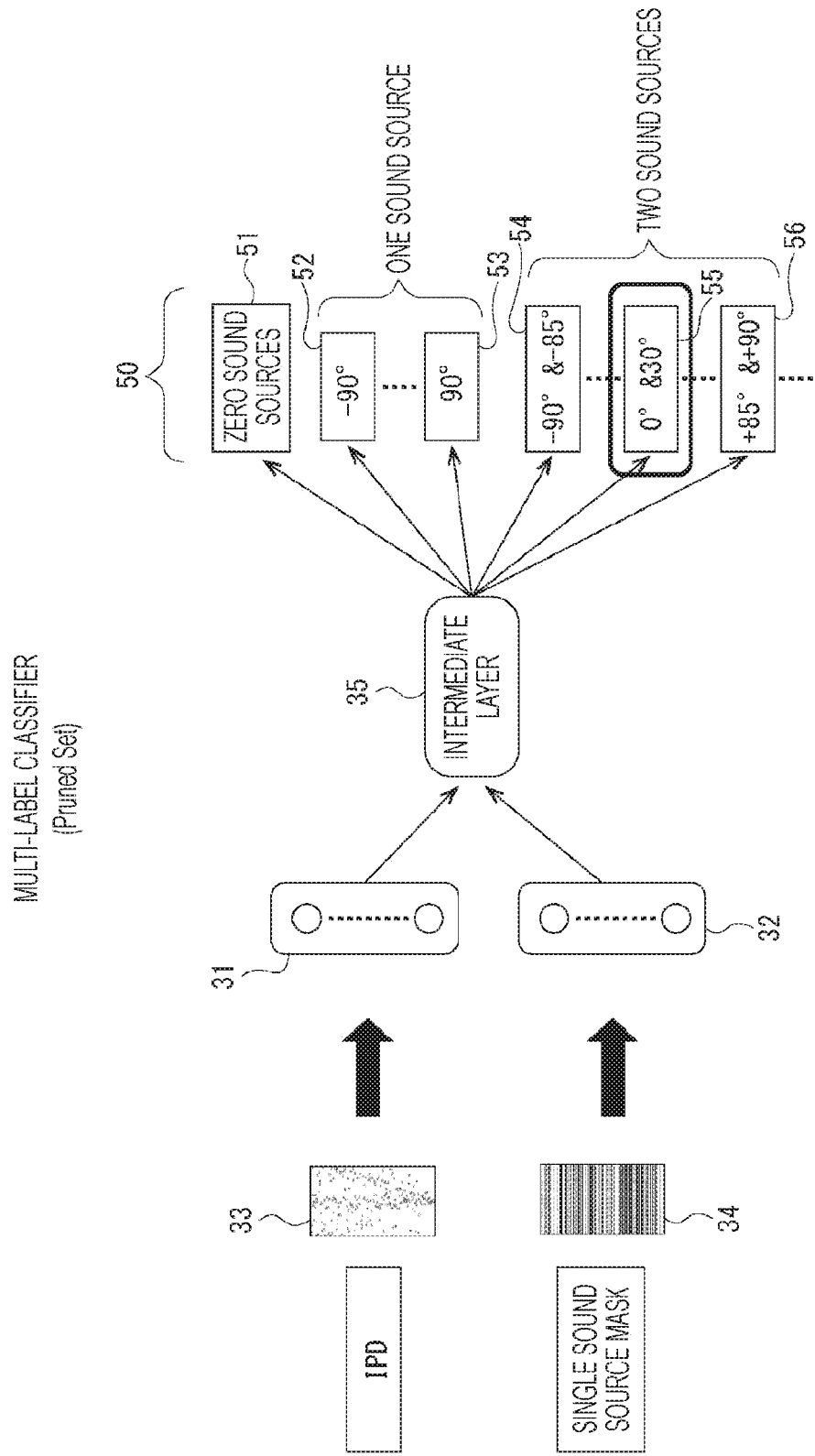

FIG. 11

EXAMPLE OF CLASS-DIRECTION CONVERSION UNIT

| CLASS ID | SOUND SOURCE DIRECTION INFORMATION |
|---|---|
| 1 | −90° |
| 2 | −85° |
| ⋮ | ⋮ |
| 36 | +85° |
| 37 | +90° |

FIG. 12

EXAMPLE OF CLASS-DIRECTION CONVERSION UNIT

| CLASS ID | SOUND SOURCE DIRECTION INFORMATION | NOTE |
|---|---|---|
| 1 | ZERO SOUND SOURCES | VALUE REPRESENTING THAT NO DIRECTIONAL SOUND SOURCE EXISTS |
| 2 | −90° | ONE SOUND SOURCE |
| 3 | −85° | |
| ⋮ | ⋮ | |
| 37 | +85° | |
| 38 | +90° | |
| 39 | −90° &−85° | TWO SOUND SOURCES |
| 40 | −90° &−80° | |
| ⋮ | ⋮ | |
| 703 | +80° &+90° | |
| 704 | +85° &+90° | |
| 705 | −90° &−85° &−80° | THREE SOUND SOURCES |
| ⋮ | ⋮ | |

FIG. 20

TOTALING RESULTS (CORRECT RATE [%])

| $T_1 (= T_2)$ | SINGLE SOUND SOURCE MASK EFFECTIVE (EMBODIMENT) | | SINGLE SOUND SOURCE MASK NOT EFFECTIVE (COMPARATIVE EXAMPLE) | |
|---|---|---|---|---|
| | SOUND SOURCE 5-1 | SOUND SOURCE 5-2 | SOUND SOURCE 5-1 | SOUND SOURCE 5-2 |
| 10 | 54.0 | 80.7 | 16.8 | 87.3 |
| 15 | 55.6 | 82.7 | 11.9 | 90.1 |
| 20 | 55.4 | 84.0 | 8.5 | 91.4 |
| 25 | 54.9 | 84.8 | 7.3 | 92.0 |
| 30 | 53.7 | 85.4 | 6.6 | 92.5 |

201　202　203　204　205

SOUND SOURCE DIRECTION ESTIMATION DEVICE, SOUND SOURCE DIRECTION ESTIMATION METHOD, AND PROGRAM

CROSS REFERENCE TO RELATED APPLICATIONS

This application is a U.S. National Phase of International Patent Application No. PCT/JP2019/002811 filed on Jan. 28, 2019, which claims priority benefit of Japanese Patent Application No. JP 2018-064439 filed in the Japan Patent Office on Mar. 29, 2018. Each of the above-referenced applications is hereby incorporated herein by reference in its entirety.

TECHNICAL FIELD

The present technology relates to a sound source direction estimation device, a sound source direction estimation method, and a program, and particularly relates to a technique to estimate a direction of a sound source from inputs from two microphones.

BACKGROUND ART

Patent Documents 1 and 2 below are known as methods for estimating directions of a plurality of sound sources with two microphones by utilizing sparseness of the sound sources.

These methods assume that the number of sound sources per frequency bin is one at the maximum. Then, only one sound source direction is estimated for every frequency bin, and then clustering of the sound source direction is performed for all frequency bins to thereby obtain a plurality of sound source directions.

Furthermore, as another method for supporting a plurality of sound sources using two microphones, there is also an example in which, after performing sound source separation using a time-frequency mask, sound source direction estimation is performed for each separation result, as in Non-Patent Documents 1 and 2 below.

Non-Patent Documents 3, 4, 5, and 6 below are of direction estimation in which machine learning (deep learning) is introduced, and three or more microphones are used.

Non-Patent Document 7 below describes an example of selecting frequency bins using a ratio of eigenvalues in sound source direction estimation.

Non-Patent Documents 8 and 9 below introduce various methods for solving a multi-label problem.

CITATION LIST

Patent Document

Patent Document 1: Japanese Patent No. 4964259
Patent Document 2: Japanese Patent Application Laid-Open No. 2007-198977

Non-Patent Document

Non-Patent Document 1: M. I. Mandel and R. J. Weiss and D. P. W. Ellis "Model-Based Expectation-Maximization Source Separation and Localization", IEEE Transactions on Audio, Speech, and Language Processing, 2010, vol. 18, No. 2, pp. 382 to 394, https://www.ee.columbia.edu/to ronw/pubs/taslp09-messl.pdf
Non-Patent Document 2: W. Q. Zheng and Y. X. Zou and C. Ritz "Spectral mask estimation using deep neural networks for inter-sensor data ratio model based robust DOA estimation" 2015 IEEE International Conference on Acoustics, Speech and Signal Processing (ICASSP), 2015, pp. 325 to 329
Non-Patent Document 3: X. Xiao and S. Zhao and X. Zhong and D. L. Jones and E. S. Chng and H. Li "A learning-based approach to direction of arrival estimation in noisy and reverberant environments" 2015 IEEE International Conference on Acoustics, Speech and Signal Processing (ICASSP), 2015, pp. 2814 to 2818
Non-Patent Document 4: Ryu Takeda, Kazunori Komatani: "Sound Source Localization based on Deep Neural Networks with Directional Activate Function Exploiting Phase Information" ICASSP 2016, pp. 405 to 409, Mar. 23, 2016.
Non-Patent Document 5: Ryu Takeda, Kazunori Komatani "Discriminative Multiple Sound Source Localization based on Deep Neural Networks using Independent Location Model" Proceedings of IEEE Workshop on Spoken Language Technology (SLT), pp. 603 to 609, Dec. 16, 2016.
Non-Patent Document 6: Sharath Adavanne, Archontis Politis, Tuomas Virtanen "Direction of arrival estimation for multiple sound sources using convolutional recurrent neural network," arXiv preprint arXiv: 1710.10059, 2017, https://arxiv.org/pdf/1710.10059.pdf
Non-Patent Document 7: Mohan S., Lockwood M. E., Kramer M. L., and Jones D. L.: "Localization of multiple acoustic sources with small arrays using a coherence test" J. Acoust. Soc. Am., 123 (4), 2136 to 2147 (2008), https://www.ncbi.nlm.nih.gov/pmc/articles/PMC2811542/
Non-Patent Document 8: G. Tsoumakas, I. Katakis, I. Vlahavas "Mining Multi-label Data" Data Mining and Knowledge Discovery Handbook, Part 6, 0. Maimon, L. Rokach (Ed.), Springer, 2nd edition, pp. 667 to 685, 2010, http://lpis.csd.auth.gr/paper_details.asp?publicationID=290
Non-Patent Document 9: Read, J., Perez-Cruz, F.: "Deep learning for multi-label classification." CoRR abs/1502.05988 (2015), https://arxiv.org/abs/1502.05988

SUMMARY OF THE INVENTION

Problems to be Solved by the Invention

Incidentally, with these methods, in a case where the number of microphones is limited to two, it is expected that direction estimation with high accuracy is possible for one sound source, but direction estimation with high accuracy is difficult for two or more mixed sound sources.

Therefore, it is an object of the present disclosure to provide a technique capable of responding to a plurality of sound sources and performing highly accurate direction estimation, in a state that the number of microphones used is limited to two.

Solutions to Problems

A sound source direction estimation device according to the present technology includes a phase difference calculation unit that calculates an inter-microphone phase difference for every frequency band in a microphone pair including two microphones that are installed apart from each other by a predetermined distance, a single sound source mask calculation unit that calculates, for every frequency band in the microphone pair, a single sound source mask indicating whether or not a component of the frequency band is a single sound source, and a multi-label classifier that inputs the inter-microphone phase difference calculated by the phase difference calculation unit and the single sound source mask calculated by the single sound source mask calculation unit as feature quantities, and outputs a direction label associated with a sound source direction to the feature quantities.

That is, not only the inter-microphone phase difference calculated for the microphone pair but also the single sound source mask calculated for this microphone pair is input to the multi-label classifier, and zero or more sound source directions are output.

It is conceivable that the sound source direction estimation device according to the present technology described above further includes a conversion unit that converts the direction label output by the multi-label classifier into sound source direction information indicating a sound source direction.

That is, information of the direction label by the multi-label classifier is converted into the sound source direction information, and the sound source direction can be interpreted at an output destination.

In the sound source direction estimation device according to the present technology described above, it is conceivable that the phase difference calculation unit and the single sound source mask calculation unit perform calculation on inputs from one microphone pair.

It is a device that performs sound source direction estimation corresponding to a microphone pair by two microphones that are installed apart from each other by a predetermined distance.

In the sound source direction estimation device according to the present technology described above, it is conceivable that the single sound source mask calculation unit generates a covariance matrix in a time-frequency domain from input signals of a predetermined time length from the microphone pair, obtains an eigenvalue of the covariance matrix, and takes as the single sound source mask a binary mask calculated by using as a mask value a binary value about whether or not a ratio of a minimum eigenvalue and a maximum eigenvalue is below a predetermined threshold value.

In a case where only one sound source exists, the minimum eigenvalue takes a value that is quite small compared to the maximum eigenvalue, and in a case where two or more sound sources exist, the minimum eigenvalue takes a value close to the maximum eigenvalue. Furthermore, also in a case of no sound, the minimum eigenvalue takes a value close to the maximum eigenvalue as in a case of two or more sound sources. This is used to generate a single sound source mask.

In the sound source direction estimation device according to the present technology described above, it is conceivable that the single sound source mask calculation unit calculates a covariance matrix in a time-frequency domain from an input signal of a predetermined time length from the microphone pair, obtains an eigenvalue of the covariance matrix, and takes as the single sound source mask a soft mask calculated by using as a mask value a value of zero or more and one or less calculated on the basis of the ratio of a minimum eigenvalue and a maximum eigenvalue.

In the soft mask thus calculated, a mask value close to 1 is calculated in a case where only one sound source exists, and a mask value close to zero is calculated in a case where two or more sound sources exist or in a case of no sound.

In the sound source direction estimation device according to the above-described present technology, it is conceivable that the multi-label classifier includes a same number of binary classifiers as a number of classifications of directions, each of the binary classifiers is associated with each direction, and when a feature quantity is input, zero or more binary classifiers corresponding to a direction in which a sound source exists output true values, and a direction label associated with the binary classifier that has output the true value is output as a sound source direction.

That is, a classifier called binary relevance is used as the multi-label classifier.

In the sound source direction estimation device according to the present technology described above, it is conceivable that the multi-label classifier is a neural network and includes one input layer, one output layer, and one or more intermediate layers, the input layer includes a unit that inputs the inter-microphone phase difference for every frequency band and a unit that inputs the single sound source mask for every frequency band, the output layer includes a same number of units as a number of classifications of directions, and each of the units is associated with a different direction, data input to the input layer is propagated to the output layer, and only when a value of each of the units of the output layer exceeds a predetermined threshold value, the unit is considered to have output a true value, and a direction label associated with the unit that has output the true value is output as a sound source direction.

Thus, a classifier called binary relevance is achieved.

In the sound source direction estimation device according to the present technology described above, it is conceivable that the multi-label classifier includes a same number of classification classes as a total number of combinations of zero or more and M or less directions different from each other where M is an upper limit of a number of sound sources for which estimation is possible, each class is associated with zero or more sound source directions, when a feature quantity is input, the feature quantity is classified into one of the classes, and zero or more direction labels associated with the classified class are output as sound source directions.

That is, as the multi-label classifier, a classifier called pruned set is used.

In the sound source direction estimation device according to the present technology described above, it is conceivable that the multi-label classifier is a neural network and includes one input layer, one output layer, and one or more intermediate layers, the input layer includes a unit that inputs the inter-microphone phase difference for every frequency band and a unit that inputs the single sound source mask for every frequency band, the output layer includes a same number of units as a total number of combinations of zero or more and M or less directions different from each other, each class is associated with zero or more sound source directions, data input to the input layer is propagated to the output layer, a unit that has a maximum value among units of the output layer is selected, and zero or more direction labels associated with the selected unit are output as sound source directions.

Thus, a classifier called pruned set is achieved.

In the sound source direction estimation device according to the present technology described above, it is conceivable that the phase difference calculation unit and the single sound source mask calculation unit perform calculation on inputs from a plurality of microphone pairs.

It is a device that performs the sound source direction estimation corresponding to a plurality of microphone pairs as the microphone pair by two microphones that are installed apart from each other by a predetermined distance.

In the sound source direction estimation device according to the present technology described above, it is conceivable that at least two microphone pairs of the plurality of microphone pairs share one microphone of each of the microphone pairs.

For example, it is a state that one microphone of the three microphones is shared to form two microphone pairs.

In the sound source direction estimation device according to the present technology described above, it is conceivable that the phase difference calculation unit calculates an argument of a complex number for an upper right or lower left element of the covariance matrix generated in calculation of the single sound source mask by the single sound source mask calculation unit, and takes a value thereof as the inter-microphone phase difference.

That is, the inter-microphone phase difference is also calculated from the covariance matrix.

A sound source direction estimation method according to the present technology includes, in an information processing device, calculating an inter-microphone phase difference for every frequency band in a microphone pair including two microphones that are installed apart from each other by a predetermined distance, calculating, for every frequency band in the microphone pair, a single sound source mask indicating whether or not a component of the frequency band is a single sound source, and inputting the calculated inter-microphone phase difference and the calculated single sound source mask as feature quantities to a multi-label classifier, and outputting a direction label associated with a sound source direction to the feature quantities.

A program according to an embodiment of the present technology is a program that causes an information processing device to execute processes of the sound source direction estimation method of the sound source as described above.

Thus, processes for sound source direction estimation in the information processing device are executed.

Effects of the Invention

According to the present technology, it is possible to perform direction estimation with high accuracy and corresponding to a plurality of sound sources, under a restriction that two microphones are used.

Note that the effect described here is not necessarily limited, and may be any effect described in the present disclosure.

BRIEF DESCRIPTION OF DRAWINGS

FIG. 4 is an explanatory diagram of a multi-label classifier of the embodiment.

FIG. 5 is an explanatory diagram of a multi-label classifier of the embodiment.

FIG. 11 is an explanatory diagram of a class-direction conversion unit of the embodiment.

FIG. 12 is an explanatory diagram of a class-direction conversion unit of the embodiment.

FIG. 20 is an explanatory diagram of totaling results.

MODE FOR CARRYING OUT THE INVENTION

Figure 1:
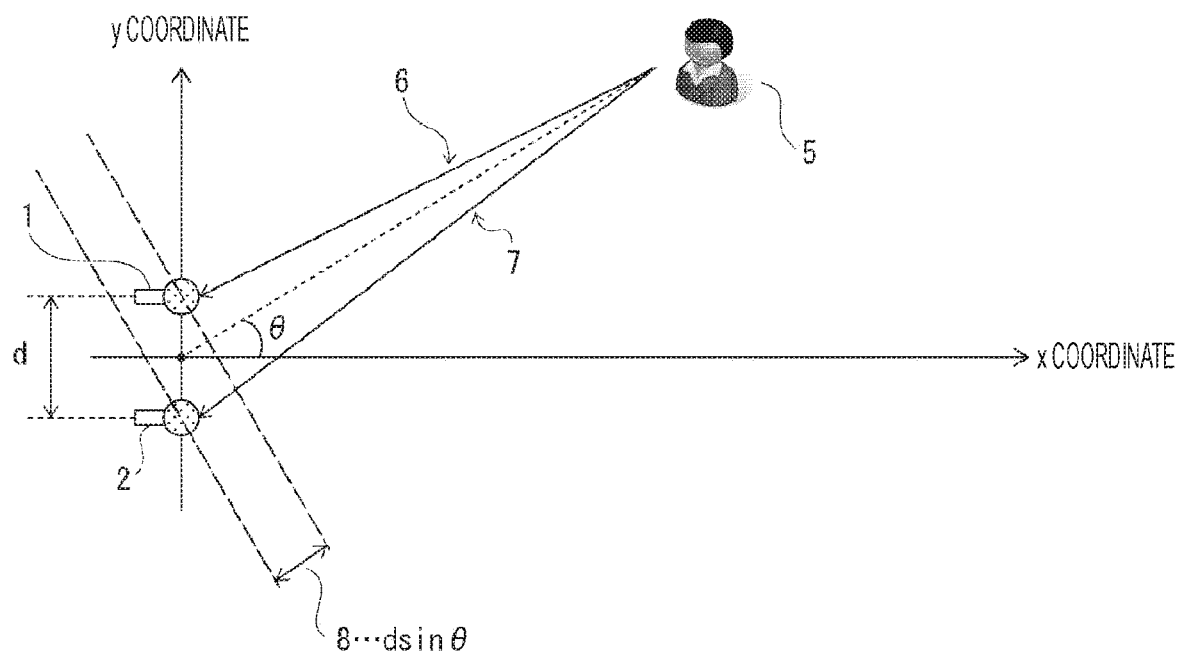
FIG. 1 is an explanatory diagram of a relationship between a sound source direction and a path difference according to an embodiment of the present technology.

Hereinafter, an embodiment will be described in the following order.
<1. Idea of embodiment>
[1-1 Overview and related technique]
[1-2 Input feature quantity]
[1-3 Multi-label classifier]
[1-4 Example of learning data]
<2. Device configuration and processing example>
[2-1 Configuration example]
[2-2 Process example]
[2-3 Effect verification]
[2-4 Modification example]
<3. Summary and modification example>

1. Idea of Embodiment 1-1 Overview and Related Technique

Hereinafter, a sound source direction estimation device according to an embodiment will be described. Here, prior to the description of a specific configuration of the embodiment, an overview of a technique of the embodiment and a related technique for understanding this technique will be described.

The sound source direction estimation method of the present embodiment is a method capable of estimating a plurality of sound source directions by using one or more microphone pairs, and is capable of estimating directions of a plurality of sound sources even with two microphones.

As an input feature quantity, in addition to an inter-microphone phase difference calculated for every frequency, a single sound source mask that represents whether or not the frequency includes only one sound source by binaries or continuous values is also used. Furthermore, in order to output a plurality of sound source directions, a multi-label classifier capable of giving a plurality of direction labels to an input feature quantity for one time is used. The multi-label classifier learns using two types of input feature quantities and corresponding sound source direction labels.

Due to operation of the single sound source mask, a frequency in which a plurality of sound sources is mixed and there is a complicated phase difference is ignored, and thus even with a relatively small amount of learning data, it is also possible to construct a direction estimator that supports a plurality of sound sources and is highly accurate.

Such technique of the embodiment of the present disclosure as described above is for estimating a sound source direction, and is a method capable of estimating a plurality of (zero or more) sound source directions simultaneously and for every frame by using two microphones. Furthermore, another feature is to treat the sound source direction estimation as a machine learning (deep learning)-based classification problem.

The related technique will be described below from the following two viewpoints.

a) A method capable of estimating a plurality of sound source directions with two microphones b) Sound source direction estimation using a machine learning-based classifier First, "a) A method capable of estimating a plurality of sound source directions with two microphones" will be described.

Unless otherwise specified, the sound source mentioned herein indicates a directional sound source (a sound source whose arrival direction is clear), and an omnidirectional sound source (a sound source whose arrival direction is unclear) is excluded. Therefore, the plurality of sound sources means that a plurality of directional sound sources exists simultaneously, and a mixed signal of them is observed with a microphone. On the other hand, a mixture of a single directional sound source and one or more omnidirectional sound sources is included in the single sound source.

The MUSIC method is known as a method capable of estimating a plurality of sound source directions, but the MUSIC method requires N+1 microphones to estimate N sound source directions.

In other words, two microphones can estimate only one sound source direction. Therefore, another method is needed to estimate two or more sound source directions.

Since the plurality of sound sources is estimated with two microphones, it is assumed that sound sources are sparse. Even a sound source that seems to sound constantly, there may be a case where a silent part exists in a finely divided frequency, and this tendency is particularly remarkable in a case of voice. Therefore, even if two or more sound sources seem to be mixed, there is a high possibility that a portion exists where there is only a single sound source in the finely divided frequency band.

When sound source direction estimation is performed using such a portion, even if only a single sound source direction can be estimated for every frequency band, a plurality of directions can be estimated in all frequency bands.

Hereinafter, "every frequency band that is finely divided" is referred to as "narrow band", and "all frequency bands" are referred to as "wide band". Furthermore, a signal observed by the microphones is called an observed signal.

In the present disclosure, direction estimation corresponding to a plurality of sound sources using sparseness of sound sources is classified into the following two types and described.

a-1) Direction estimation of a single sound source is performed in the narrow band, and then a sound source direction is clustered in the wide band. (There are Patent Documents 1 and 2 as examples)

a-2) Sound source separation using a time-frequency mask is performed, and direction estimation of a single sound source is performed for every separation result. (There are Non-Patent Documents 1 and 2 as examples)

First, a-1) will be described.

For simplicity, it is assumed that there are two sound sources and they are located in different directions when viewed from the microphones. When they are called sound source A and sound source B, a way of mixing and a sound source direction for every frequency can be classified into four types of (1), (2), (3), and (4) in Table 1.

TABLE 1

WAY OF MIXING AND SOUND SOURCE DIRECTION FOR EVERY FREQUENCY IN CASE OF TWO SOUND SOURCES

| WAY OF MIXING | SOUND SOURCE DIRECTION |
| --- | --- |
| (1) ONLY SOUND SOURCE A EXISTS | DIRECTION OF SOUND SOURCE A |
| (2) ONLY SOUND SOURCE B EXISTS | DIRECTION OF SOUND SOURCE B |
| (3) BOTH EXIST | INDEFINITE (DEPENDING ON WAY OF MIXING) |
| (4) NEITHER EXISTS | INDEFINITE |

If the two sound sources are sufficiently sparse, the ratio occupied by (1) and (2) in Table 1 will increase in the wide band. Therefore, when clustering the sound source directions in the wide band, two clusters are generated, and directions of the sound source A and the sound source B are obtained as representative directions of each cluster.

Next, a-2) will be described.

The sound source separation using the time-frequency mask is a process of leaving the time and frequency in which only a desired sound source exists and masking other times and frequencies, with respect to the time and frequency of a signal (spectrogram) in a time-frequency domain.

In the example of two sound sources in Table 1, a mask for leaving the sound source A and a mask for leaving the sound source B are generated respectively, the former masks (2), (3), and (4) while leaving (1), and the latter masks (1), (3), and (4), leaving (2). The description of a mask generation method is omitted.

Since a separation result generated by applying the mask to the microphone observed signal in the time-frequency domain includes only a single sound source, ideally a single sound source direction is estimated from each separation result.

Next, "b) sound source direction estimation using a machine learning-based classifier" will be described.

In the following, reference will be made also to methods that use three or more microphones and methods that can estimate only a single sound source.

The basic idea of sound source direction estimation by a classifier is that if it is estimation in discrete directions, the sound source direction estimation can be solved as a classification problem. For example, a problem of estimating directions with granularity of 5° in the range of half circle or 180° can be interpreted as a problem of classifying observed signals of 37 classes corresponding to −90°, −85°, . . . , +85°, and +90° (or feature quantities obtained therefrom).

In recent years, machine learning, particularly a classifier using a deep neural network (DNN), has been actively studied, and there are case examples in which a sound source direction estimation problem is solved using a DNN-based classifier.

In Non-Patent Document 3, a sound waveform cross-correlation function is calculated for every pair of microphones, and a vector obtained by connecting all of them is input to the DNN-based classifier as an input feature quantity to perform classification.

In Non-Patent Document 4, part of processing of the MUSIC method is replaced with the DNN-based classifier. In the MUSIC method, there are variations in processes from calculation of the narrowband spatial directional characteristic (MUSIC spectrum) to estimation of a wideband sound source direction, but in Non-Patent Document 4, by learning a classifier in advance that uses the narrowband spatial directional characteristics for all frequencies as an input feature quantity, a sound source direction as a classification result is directly obtained.

In Non-Patent Document 4, only a single sound source can be estimated, but in Non-Patent Document 5, the estimation is extended to a plurality of sound sources. Therefore, as the learning data, an input feature quantity derived from a mixed sound of a plurality of sound sources and a label associated with a plurality of sound source directions are used.

Furthermore, in a real environment, each sound source does not always sound constantly, and even if M sound sources exist at the maximum, there may be a case where the number of sound sources mixed at a certain timing is less than M, or a case where there is no sounding sound source (zero sound sources, that is, no sound). In order to deal with such a case, learning data from zero mixed sound sources to M mixed sound sources are prepared.

In Non-Patent Document 6, two DNNs are used, which are DNN1 and DNN2 below. In other words, in Non-Patent Document 5, only the latter half process of the MUSIC method is replaced with a DNN base, but in Non-Patent Document 6, generation of a MUSIC spectrum corresponding to the first half process of the MUSIC method is also replaced with the DNN base.

DNN1: an amplitude spectrogram and a phase spectrogram generated for every microphone are input, and a spatial directional characteristic pattern similar to the MUSIC spectrum is output.

DNN2: when the spatial directional characteristic pattern generated by the DNN1 is input, an output unit linked to a direction in which a sound source exists ignites (outputs a true value).

The advantage of using machine learning in sound source direction estimation is that even if the correspondence relationship between an input feature quantity and a sound source direction is complicated, there is a possibility that the relationship can be learned if there is sufficient learning data. Specifically, the following advantages can be mentioned.

It is possible to directly learn the correspondence relationship from a feature quantity in the narrow band to a sound source direction in the wide band. Therefore, it is possible to avoid a problem of spatial aliasing (a problem that a plurality of sound source directions corresponding to feature quantities in the narrow band exists in a band equal to or higher than a specific frequency and cannot be uniquely specified).

Regarding factors such as reverberation, reflection, and even omnidirectional noise that generally lead to a reduction in accuracy of sound source direction estimation, these factors can be included in the learning data so as to cover accuracy degradation.

Depending on the positional relationship between the microphones and sound sources, there are positions where the input feature quantity changes sensitively due to movement of the sound sources and positions where they do not, and it is generally difficult for the latter positions to perform highly accurate direction estimation. However, in the machine learning based method, the accuracy can be improved by increasing learning data corresponding to such a direction.

The sound source direction estimation using a machine learning-based classifier, particularly a DNN-based classifier, has such advantages. However, it is difficult to use two microphones and further apply them directly to a method that can estimate a plurality of sound sources for the reason described below.

The method of Non-Patent Document 3 uses a cross-correlation function calculated from a waveform as an input feature quantity, but this feature quantity, if there is a sound source different from the sound source whose direction is to be estimated (interfering sound), has a problem of decreased estimation accuracy regardless of whether the interfering sound is a directional sound source or an omnidirectional sound source.

On the other hand, the methods of Non-Patent Documents 4, 5, and 6 use the same (or similar) feature quantity as the MUSIC method, and therefore the same restrictions as the MUSIC method apply. The MUSIC method utilizes the nature that a valley or a peak is formed at the position corresponding to a sound source direction on the MUSIC spectrum, which is on a premise that null beams (low-sensitivity directional characteristic) are formed in all sound source directions. However, the maximum number of null beams that can be formed by N microphones is in N−1 directions at the maximum, and thus if two microphones are used, they will fail to form null beams except when the number of sound sources is one. Specifically, a clear null beam is not formed in any direction, or a behavior is exhibited such that a false null beam is formed in a direction where no sound source exists. Thus, it is highly possible that an inaccurate sound source direction is estimated from such a MUSIC spectrum.

Therefore, in any of the methods of Non-Patent Documents 3, 4, 5, and 6, in a case where the number of microphones is limited to two, even if highly accurate direction estimation is possible for one sound source, it is expected that accurate direction estimation will be difficult for mixing of two or more sound sources.

Therefore, in the present embodiment, the following is performed in order to perform direction estimation with high accuracy for a plurality of (zero or more) sound sources with two microphones.

Not only a) but also b) below is used as an input feature quantity.

a) Inter-microphone phase difference (interaural or inter-channel phase difference: IPD)

b) Quantity representing unity of a sound source, calculated for every frequency (single sound source mask)

A classifier called a multi-label classifier is used to simultaneously estimate (output) a plurality of sound source directions.

Hereinafter, each of the input feature quantities and the multi-label classifier will be described, and further, learning data used in the multi-label classifier will also be described.

1-2 Input Feature Quantity

Here, first, an inter-microphone phase difference (IPD) will be described, then inadequacy of this alone as a feature quantity will be pointed out, and a single sound source mask as a new feature quantity that is used in the embodiment to solve the problem will also be described.

IPD depends on a difference in the path from a sound source to each microphone, and the path difference depends on the sound source direction.

The relationship will be described with reference to FIG. 1.

FIG. 1 illustrates a state in which two microphones 1 and 2 are installed apart from each other by a distance d. Both microphones 1 and 2 are located on a y-axis, and a midpoint between them is the origin of x-y coordinates. The angle formed by a line connecting the origin and a sound source 5 and an x-axis is a sound source direction θ.

In this diagram, a sound source is located in a positive part on the x-axis when the sound source direction θ=0, and is located in a positive part on the y-axis when θ=90°.

Furthermore, a sound source located below the x-axis is represented by a negative value of θ.

In FIG. 1, transmission paths of sound from the sound source 5 to the respective microphones 1 and 2 are illustrated as a transmission path 6 and a transmission path 7, respectively.

When 0<θ≤90°, the transmission path 7 is longer than the transmission path 6. The path difference 8 between the transmission path 6 and the transmission path 7 depends on the sound source direction θ, but when it is assumed that the distance from the microphones 1 and 2 to the sound source 5 is sufficiently large compared to the distance d, and the transmission paths are the same at any frequency, the path difference 8 can be approximated as d sin θ (hereinafter, it may be referred to as "path difference d sin θ").

Since the frequency and the IPD are proportional to the fixed path difference 8, the path difference 8 and the sound source direction θ can be obtained if the IPD is known. The IPD calculation method will be described using (Mathematical Formula 1).

[Mathematical Formula 1]

$$IPD(f, t) = \left(\frac{X_1(f, t)}{X_2(f, t)}\right) \quad [1.1]$$

$$IPD(f, t) = \text{angle}(X_1(f, t)\overline{X_2(f, t)}) \quad [1.2]$$

$$IPD(f, t) = \left(\frac{1}{T_1}\sum_{\tau=0}^{T_1} X_1(f, t-\tau)\overline{X_2(f, t-\tau)}\right) \quad [1.3]$$

Signals obtained by applying a short-time Fourier transform (SIFT) to signals observed by the microphones 1 and 2 are $X_1(f, t)$ and $X_2(f, t)$, respectively. Details of SIFT will be described later.

Symbols f and t are a frequency bin and a frame number (index) generated by SIFT, respectively.

The IPD can be calculated for every frequency bin and for every frame, and a calculation formula thereof is as in above formula [1.1] or formula [1.2]. However, angle(x) is an operator that calculates an argument of a complex number x, and the argument is represented by a radian value from −π to +π.

The IPD may be calculated from multiple frames, and a calculation formula therefor is as formula [1.3].

In this formula, the IPD is calculated using $T_1$ frames from $(t-T_1+1)$th to t-th. In this formula [1.3], $X_2(f, t-\tau)$ with an overline represents a conjugate complex number of $X_2$ (f, t−τ).

The relationship between the IPD calculated in this manner and the sound source direction θ will be described with reference to FIGS. 2A, 2B, 2C, 2D, and 2E.

Figure 2C:
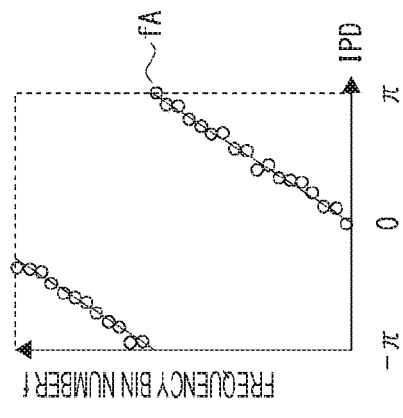
FIGS. 2A, 2B, 2C, 2D, and 2E are explanatory diagrams of input feature quantities of the embodiment.
Figure 2B:
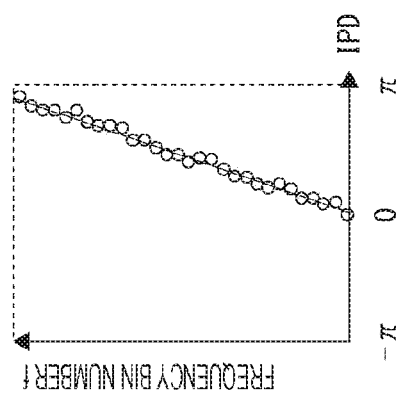
Figure 2E:
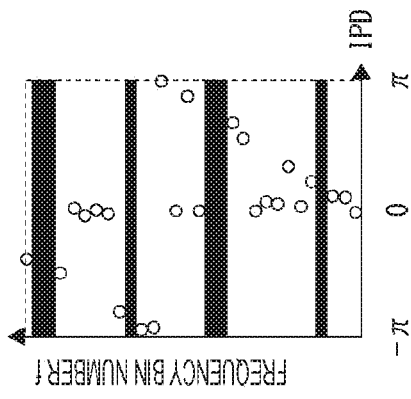
Figure 2A:
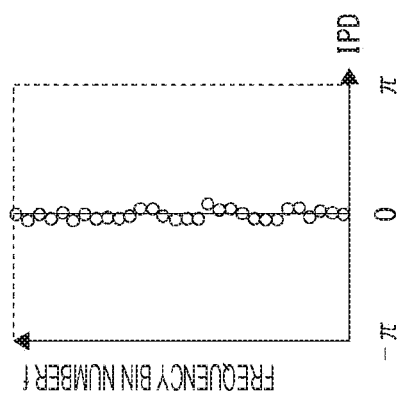

FIG. 2A is a diagram plotting the relationship between the IPD and the frequency in a case where θ=0°.

In this diagram, the IPD at a certain frame number t, the vertical axis represents the frequency bin number f, and the horizontal axis represents the IPD. One white circle represents the IPD in that frequency bin. However, this diagram is schematic, and the plot of actual data is different from this.

In a case where θ=0° in FIG. 1 above, the phase difference is zero in principle because distances from the sound source 5 to the two microphones are equidistant, but in an actual environment, the IPD spreads to some extent around zero being the center due to reverberation and the like.

FIG. 2B is a plot of the relationship between the IPD and the frequency at θ=30°. In a case where θ=30°, the sound source 5 is closer to the microphone 1 than the microphone 2, and thus the signal observed by the microphone 1 is advanced in phase than that by the microphone 2. That is, there is a phase difference. Since the phase difference is proportional to the frequency, that is, also to the frequency bin number f, the white circle representing IPD is located on a straight line with a predetermined slope.

However, also in this case, due to the influence of reverberation and the like, the IPD is distributed with a certain spread from the straight line.

FIG. 2C is a plot of the relationship between the IPD and the frequency at θ=90°. Since the path difference d sin θ is large compared to that in FIG. 2B, the slope of the straight line becomes even larger (represented as a straight line that further falls sideways in this diagram).

Furthermore, the wavelength is inversely proportional to the frequency and half of the wavelength is smaller than the path difference d sin θ at a specific frequency or higher, and thus spatial aliasing occurs in such a band. In this diagram, the IPD jumps from π to −π before and after the frequency fA, which means that spatial aliasing occurs in a band higher than that.

Thus, the plot of the IPD has different tendencies for every sound source direction. Therefore, by using the IPD as an input feature and learning the correspondence between the IPD and the sound source direction by the DNN or the like, the sound source direction estimation for the observed signal including only one sound source can be achieved relatively easily.

However, in a case where only the IPD is used as a feature quantity, it is difficult to estimate the directions of a plurality of sound sources simultaneously and accurately. This point will be described below.

Even if the number of sound sources is limited to two for simplicity, there are four ways of mixing of sound sources for every frequency, as listed in Table 1. The IPD for each case is as (1), (2), (3), and (4) in Table 2.

Note that the two sound sources will be referred to as "sound source A" and "sound source B".

TABLE 2

WAY OF MIXING AND INTER-MICROPHONE PHASE DIFFERENCE (IPD) FOR EVERY FREQUENCY BIN IN CASE OF TWO SOUND SOURCES

| WAY OF MIXING | IPD |
| --- | --- |
| (1) ONLY SOUND SOURCE A EXISTS | ON STRAIGHT LINE CORRESPONDING TO DIRECTION OF SOUND SOURCE A |

TABLE 2-continued

WAY OF MIXING AND INTER-MICROPHONE PHASE DIFFERENCE (IPD) FOR EVERY FREQUENCY BIN IN CASE OF TWO SOUND SOURCES

| WAY OF MIXING | IPD |
|---|---|
| (2) ONLY SOUND SOURCE B EXISTS | ON STRAIGHT LINE CORRESPONDING TO DIRECTION OF SOUND SOURCE B |
| (3) BOTH EXIST | INDEFINITE (DEPENDING ON WAY OF MIXING) |
| (4) NEITHER EXISTS | INDEFINITE |

Figure 2D:
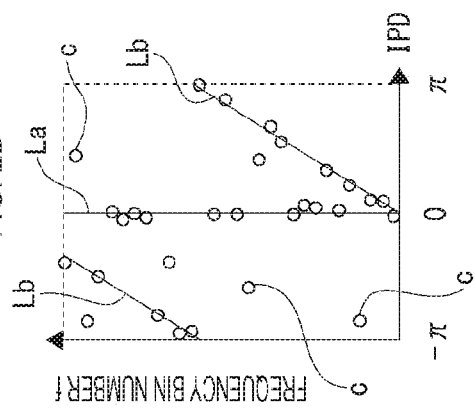

An image of a plot of the IPD corresponding to Table 2 is illustrated in FIG. 2D. In this diagram, the directions of sound source A and sound source B are 0° and 90°, respectively. White circles existing on a straight line La corresponding to the sound source direction θ=0° are frequency bins corresponding to (1) of Table 2, and white circles existing on a straight line Lb corresponding to the sound source direction θ=90° belong to frequency bins of (2) of Table 2.

The other white circles c belong to frequency bins of (3) or (4) in Table 2.

When generalized to an arbitrary number of sound sources, the relationship between the way of mixing and the IPD for every frequency bin is as follows.

a) In a case where only one sound source exists in the frequency bin, the IPD is located on the straight line corresponding to the direction of the sound source.

b) In another frequency bin, that is, in a frequency bin where there is no sound or two or more sound sources are mixed, the IPD has an indefinite value.

Since the IPD of the frequency bin of the above b) takes a value that is independent of the sound source direction, it becomes a factor that hinders correct estimation. That is, the key to correctly estimating the directions of a plurality of sound sources is to find and exclude the frequency bin corresponding to the above b).

For example, by masking the frequency bins corresponding to the above b) in FIG. 2D in black, FIG. 2E is obtained. In this FIG. 2E, it can be easily determined that the white circles remaining without being masked are located on two straight lines, as compared to a case without a mask.

Such a mask that leaves only frequency bins of other than one sound source and excludes others is called a "single sound source mask". As will be described later, the single sound source mask may be of a continuous value (soft mask) or a gradation value (gradation mask) in addition to a true-false binary value (binary mask).

In a case where a plurality of sound source directions is estimated from IPDs of frequency bins in which only one sound source exists, the problem is reduced to the following two points (P1) and (P2).

(P1) How to calculate a single sound source mask.

(P2) In a case of using a DNN-based classifier, as the DNN cannot exclude part of the input data, how to achieve an equivalent process.

Here, the point (P1) will be described. The point (P2) will be described later together with a multi-label classifier.

Various methods are conceivable for determining whether or not the number of sound sources (correctly, the number of directions in which sound sources arrive) is single. Here, a method of using eigenvalues of an observed signal covariance matrix will be described.

The calculation method of the single sound source mask is described in (Mathematical Formula 2).

[Mathematical Formula 2]

$$X(f, t) = \begin{Bmatrix} X_1(f, t) \\ X_2(f, t) \end{Bmatrix} \qquad [2.1]$$

$$\text{cov}(f, t) = \frac{1}{T_2} \sum_{\tau=0}^{T_2} X(f, t-\tau) X(f, t-\tau)^H \qquad [2.2]$$

$$\text{cov}(f, t) = [v_1(f, t) \; v_2(f, t)] \begin{bmatrix} e_1(f, t) & 0 \\ 0 & e_2(f, t) \end{bmatrix} \begin{bmatrix} v_1(f, t)^H \\ v_2(f, t)^H \end{bmatrix} \qquad [2.3]$$

$$U(f, t) = \begin{cases} 1 & \left(\frac{e_1(f, t)}{e_2(f, t)} < \alpha\right) \\ 0 & (\text{otherwise}) \end{cases} \qquad [2.4]$$

$$U(f, t) = 1 - \frac{e_1(f, t)}{e_2(f, t)} \qquad [2.5]$$

The observed signal vector $X(f, t)$ of frequency bin f and frame t is defined by formula [2.1].

When this vector is used, a covariance matrix $\text{cov}(f, t)$ calculated in $T_2$ frames from $(t-T_2+1)$th to t-th is represented by formula [2.2].

In this formula, a superscript "H" represents a Hermitian transpose (transposes a vector or matrix and replaces each element with a conjugate complex number).

Eigenvalue decomposition is performed on this covariance matrix.

The right side of formula [2.3] is a result of eigenvalue decomposition, where $e_1(f, t)$ and $e_2(f, t)$ represent a minimum eigenvalue and a maximum eigenvalue, respectively, and $v_1(f, t)$ and $v_2(f, t)$ represent eigenvectors respectively corresponding to them. Due to the nature of the covariance matrix $\text{cov}(f, t)$, the $e_1(f, t)$ and $e_2(f, t)$ are always positive values.

There is a close relationship between the range of frames used in calculation of the covariance matrix and the number of sound sources existing in the frequency bins and the two eigenvalues. In a case where only one sound source exists, the minimum eigenvalue $e_1(f, t)$ takes a value that is quite small (that is, close to zero) compared to the maximum eigenvalue $e_2(f, t)$.

On the other hand, in a case where two or more sound sources exist, $e_1(f, t)$ takes a value close to $e_2(f, t)$. Furthermore, in a case of no sound, $e_1(f, t)$ takes a value close to $e_2(f, t)$ as in a case of two or more sound sources.

Therefore, by calculating the ratio between the minimum eigenvalue and the maximum eigenvalue and determining whether or not a value thereof is smaller than a threshold value, whether or not it is a single sound source can be found. Formula [2.4] is a formula for making this determination, and a threshold value α is a positive value close to zero.

Formula [2.4] is a formula for calculating a mask with two values (binary mask) including true and false, but the mask may be a soft mask including continuous values of zero to one.

As a formula for calculating the soft mask, for example, formula [2.5] is used. An eigenvalue calculated from the covariance matrix of an observed signal is always a positive value, and the maximum eigenvalue is larger than the minimum eigenvalue. Thus, formula [2.5] can take values from zero to one.

As the mask value, values of L+1 gradations of 0, 1/L, 2/L, . . . , and 1 may be used in addition to the continuous value.

(Gradation Mask)

Note that in the above examples, the number of microphones is limited to two, that is, one microphone pair by the microphones 1 and 2, but it may be expanded to a plurality of microphone pairs. In this case, the IPD and the single sound source mask are calculated for each microphone pair. Then, as described later, a vector generated by concatenating all the IPDs and the single sound source mask is input to the classifier as a feature quantity.

1-3 Multi-Label Classifier

The sound source direction estimation device of the present disclosure changes the number of sound source directions to be output according to the number of sound sources (directional sound sources) existing at that time. For example, in a case where no clear directional sound source exists, no sound source direction is output (or a special value indicating that "no sound source exists" is output). If one person utters in that environment, one sound source direction is output, and if another person utters during the utterance, two sound source directions are output.

To achieve such output with a classifier, the present disclosure uses a multi-label classifier. The multi-label classifier is a classifier capable of giving a variable number of labels to an input feature quantity for one time. See Non-Patent Documents 8 and 9 for various schemes to achieve it.

Although any type of multi-label classifier can be used in the present disclosure, a case where it is achieved particularly by the DNN will be described below.

Positions of changes that are unique in a case where the DNN-based classifier is used as a sound source direction estimator are concentrated in an input layer and an output layer. The input layer and the output layer will be described below in this order.

First, the input layer will be described.

In FIGS. 2A, 2B, 2C, 2D, and 2E, it has been described that the mask (single sound source mask) that represents whether or not a certain frequency bin includes only one sound source is generated, and only the IPD of a frequency bin with a mask value of 1 is reflected in the direction estimation or classification.

However, in the DNN, it is not possible to switch the input data of any dimension to be deleted or not deleted, and thus it is necessary to consider another method to reflect the mask in the classification.

Furthermore, unlike a case of applying a mask to the spectrogram (Non-Patent Document 2 and the like), it is meaningless to directly apply the mask to the IPD (multiply the IPD by the mask value), and thus a method to use the IPD after applying the mask as an input feature quantity of the DNN is also not possible.

Therefore, in the input layer of the DNN, in addition to a unit group for inputting the IPD, a unit group for inputting the single sound source mask is also prepared. In other words, a vector that can be formed by concatenating the IPD and the single sound source mask is used as an input feature quantity of the DNN, and the number of dimensions of the input layer is made to match the dimension of the vector. By using these two types of feature quantities as inputs in learning of the DNN, the tendency that the IPD of a frequency bin with a large mask value is strongly reflected in a classification result is also learned.

Thus, if the single sound source mask is also treated as one of the input feature quantities, the mask value does not have to be binary, and may be a continuous value or a gradation value.

The input layer will be described with reference to FIG. 3. Both unit groups 31 and 32 are unit groups of the input layer of the DNN, the unit group 31 is for input of IPD 33, and the unit group 32 is for input of a single sound source mask 34.

One circle in the unit groups 31 and 32 represents a unit corresponding to a specific dimension. The data input to each unit of the input layer is propagated to intermediate layers 35 (second and subsequent layers of the DNN).

Since the IPD 33 and the single sound source mask 34 are values calculated for every frequency bin, the number of units in each of the unit group 31 and the unit group 32 is the same as the number of frequency bins. Alternatively, for the two frequency bins corresponding to a lowest frequency (0 Hz) and a highest frequency (half the sampling frequency), the phase difference is always zero, and thus there is no problem in omitting it. The number of respective unit groups 31 and 32 in this case is only two less than the number of frequency bins.

In the above description, it is assumed that there is one microphone pair, but it can be extended to a plurality of microphone pairs. Since both the IPD and the single sound source mask are feature quantities calculated for every microphone pair, a unit group for inputting respective ones is prepared for every microphone pair.

Figure 3:
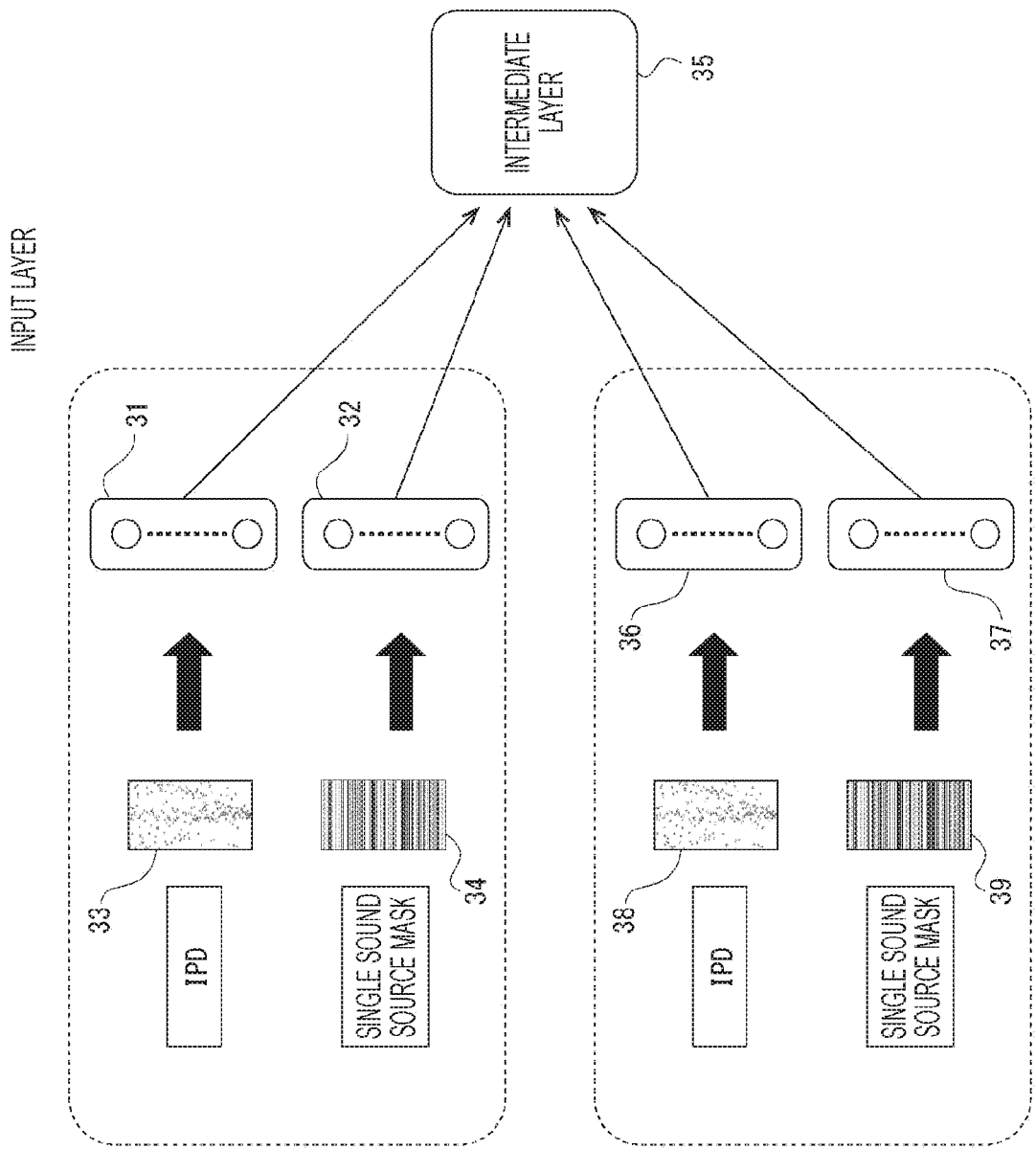
FIG. 3 is an explanatory diagram of an input layer of the embodiment.

In FIG. 3, an IPD 38 calculated by another microphone pair and a single sound source mask 39 are input to dedicated unit groups 36 and 37, respectively. Then, values input to an input layer unit are propagated to the intermediate layers 35 for all microphone pairs.

Next, the output layer of the DNN will be described.

There are various methods for solving a multi-label classification problem (see Non-Patent Document 8), and each of them can be implemented by the DNN (see Non-Patent Document 9). A difference in methods is mainly expressed as a difference in the form of the output layer.

In the following, among the various methods, two methods called a binary relevance (BR) and a pruned set (PS) will be focused and described.

FIG. 4 illustrates a DNN (BR-DNN) that supports a method called Binary Relevance (BR). The BR is characterized by preparing a binary classifier associated with each class that is a classification destination. That is, in a case of classifying sound source directions into N ways, N binary classifiers are prepared.

In BR-DNN, N units of the output layer 40 exist, each of which is associated in a discrete direction (in the diagram, a part of units 41, 42, 43, and 44 in the output layer 40 are illustrated). Whether or not each unit of the output layer 40 represents true or false is determined by whether or not an output value of the unit is larger than a predetermined threshold value.

Hereinafter, when the output value of the unit exceeds the threshold value, it is expressed as "ignites" (that is, the true value is output).

When a plurality of units ignites in the output layer 40, it means that a plurality of sound sources exists simultaneously. For example, in FIG. 4, when two units, that is, the units 42 and 43 surrounded by thick frames ignite together, it means that sound sources exist at both 0° and 30°.

Furthermore, when no unit ignites in the output layer 40, it indicates no sound (strictly, no directional sound source exists).

FIG. 5 illustrates a DNN (PS-DNN) compatible with a system called a pruned set (PS). Since the PS is a variation of the system called a label power set (LPS), the label power set (LPS) will be described first.

If there are N sound source directions, the number of sound source directions can be considered from 0 to N, and there are $2^N$ combinations of sound source directions. Therefore, in principle, if $2^N$ classes are prepared, a combination of all sound source directions can be handled by a single classifier. Preparing a power-of-two number of classes is called a label power set.

Removing classes corresponding to unnecessary combinations and low frequency combinations from the classes prepared in the label power set is called a pruned set (PS).

For example, in sound source direction estimation, the number of classes can be reduced by limiting the upper limit of the number of sound sources that can be estimated to M (0<M<N).

In the PS-DNN, the output layer has the same number of units as the number of classes after reduction, and the number can be calculated by the following formula [3.1].

[Mathematical Formula 3]

$$_NC_0 + {_NC_1} + {_NC_2} \ldots {_NC_M} \quad [3.1]$$

For example, in a case of N=37 (corresponding to a case of estimating 180° in 5° steps), the number of output units is 704 if M=2, and 8474 if M=3.

In FIG. 5, output units 50 corresponding to the number of sound sources from 0 to 2 are illustrated (in the diagram, part of units 51, 52, 53, 54, 55, and 56 in an output layer 50 is illustrated).

The unit 51 is a unit corresponding to zero sound sources, and it is classified into this class when no directional sound source exists.

The units from unit 52 to unit 53 correspond to one sound source, and if N sound source directions exist, there are N units corresponding to this one sound source.

The units from unit 54 to unit 56 are units corresponding to two sound sources. Since combinations of two sound sources are N(N−1)/2, there are units corresponding to two sound sources as many as the combinations.

In order to perform direction estimation with PS-DNN, after propagating data in the input layer to the output layer, the unit with the maximum output value is searched for in the output layer, and a label associated with that unit is assumed as a sound source direction.

For example, in FIG. 5, the unit having the maximum output value is the unit 55 with a bold frame. This unit is one of the units corresponding to two sound sources and is associated with two labels of "0°" and "30°". Therefore, it outputs an estimation result that there are two sound sources and the directions are 0° and 30°, respectively.

Note that in a case where the unit having the maximum output value is the unit 51, no sound source direction is output. Alternatively, a special label indicating "zero sound sources" may be output.

Non-Patent Document 9 also introduces DNNs compatible with other types of multi-label classifiers, and these can also be used in the present disclosure.

1-4 Example of Learning Data

Figure 6C:
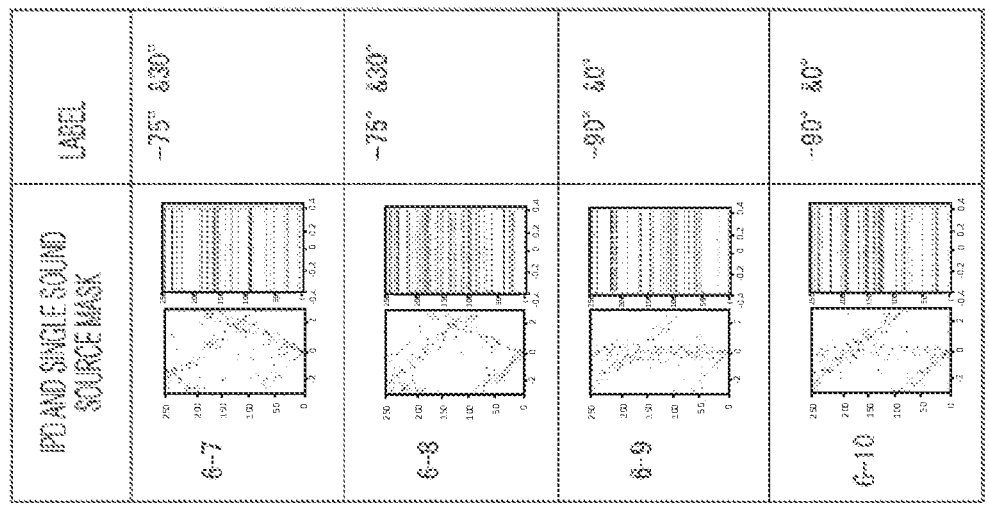
FIGS. 6A, 6B, and 6C are explanatory diagrams of learning data of the embodiment.
Figure 6B:
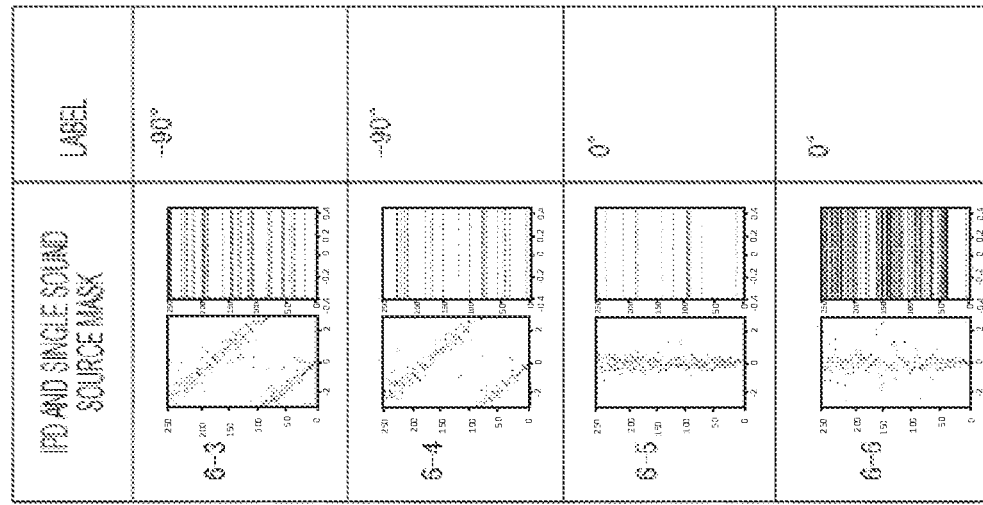
Figure 6A:
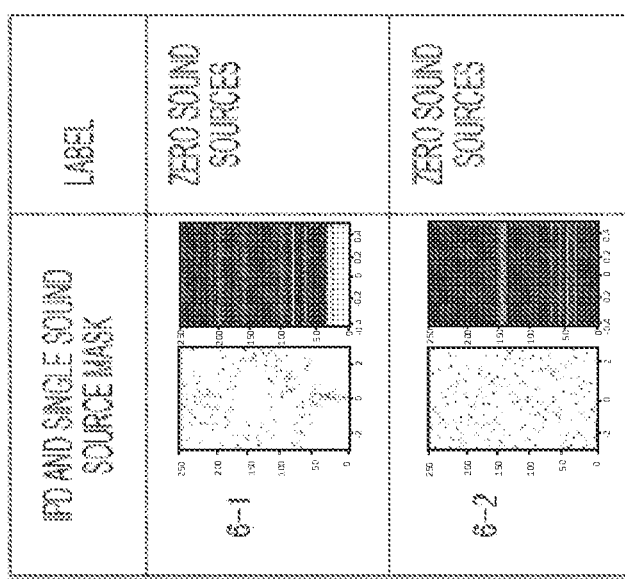

Next, an example of learning data used in learning of the DNN will be described with reference to FIGS. 6A, 6B, and 6C. FIG. 6A represents learning data of zero sound sources, FIG. 6B represents learning data of one sound source, and FIG. 6C represents learning data of two sound sources. In each of FIGS. 6A, 6B, and 6C, the left column represents the IPD and the single sound source mask that are the input feature quantity, and the right column represents a label as teacher data. In this example, there is one microphone pair. Furthermore, the single sound source mask is a binary mask with two values, and "0" and "1" are represented by a black line and a white line, respectively.

Learning data 6-1 and 6-2 are learning data corresponding to zero sound sources (a case where no clear directional sound source exists). In a case of zero sound sources, the IPD takes a value close to random and the single sound source mask has a value of "0" in most frequency bins.

The learning data 6-1 is a feature quantity generated from actually recorded sound data, and the learning data 6-2 is a feature quantity generated on the computer by imitating the feature quantity. Regarding the label, a special label representing zero sound sources is given, but in actual learning, it is used after being converted into an appropriate value according to the type of the multi-label classifier. (It is similar to the other labels in the table.)

Pieces of learning data 6-3 to 6-6 are learning data corresponding to one sound source, learning data 6-3 and 6-4 represent sound sources of −90°, and learning data 6-5 and 6-6 represent sound sources of 0°.

As described above, in a case of one sound source, since the IPD and the frequency bin number are proportional, points on a straight line can be seen in the plot of the IPD.

However, the learning data also includes a spread of distribution caused by reverberation and the like, a jump originated spatial aliases, and the like.

Even if there is only one sound source, there may be almost no sound due to the frequency bin. In such a frequency bin, the IPD has a random value and the value of the single sound source mask is "0".

Pieces of learning data 6-7 to 6-10 are learning data corresponding to two sound sources. Learning data 6-7 and 6-8 represent that sound sources exist at −75° and 30°, and learning data 6-9 and 6-10 represent that sound sources exist at −90° and 0°.

If sparseness of the sound source is established, two straight lines can be seen in the plot of the IPD in this manner. In frequency bins in which two sound sources exist together, or in frequency bins in which both sound sources are silent, the IPD has a random value, and the value of the single sound source mask is "0".

In FIGS. 6A, 6B, and 6C, two pieces of learning data are listed for the same label (or group of labels), but a larger number of pieces of learning data are prepared for actual learning.

Furthermore, learning data is prepared so as to cover all possible combinations of sound source directions for each number of sound sources.

2. Device Configuration and Processing Example 2-1 Configuration Example

Figure 7:
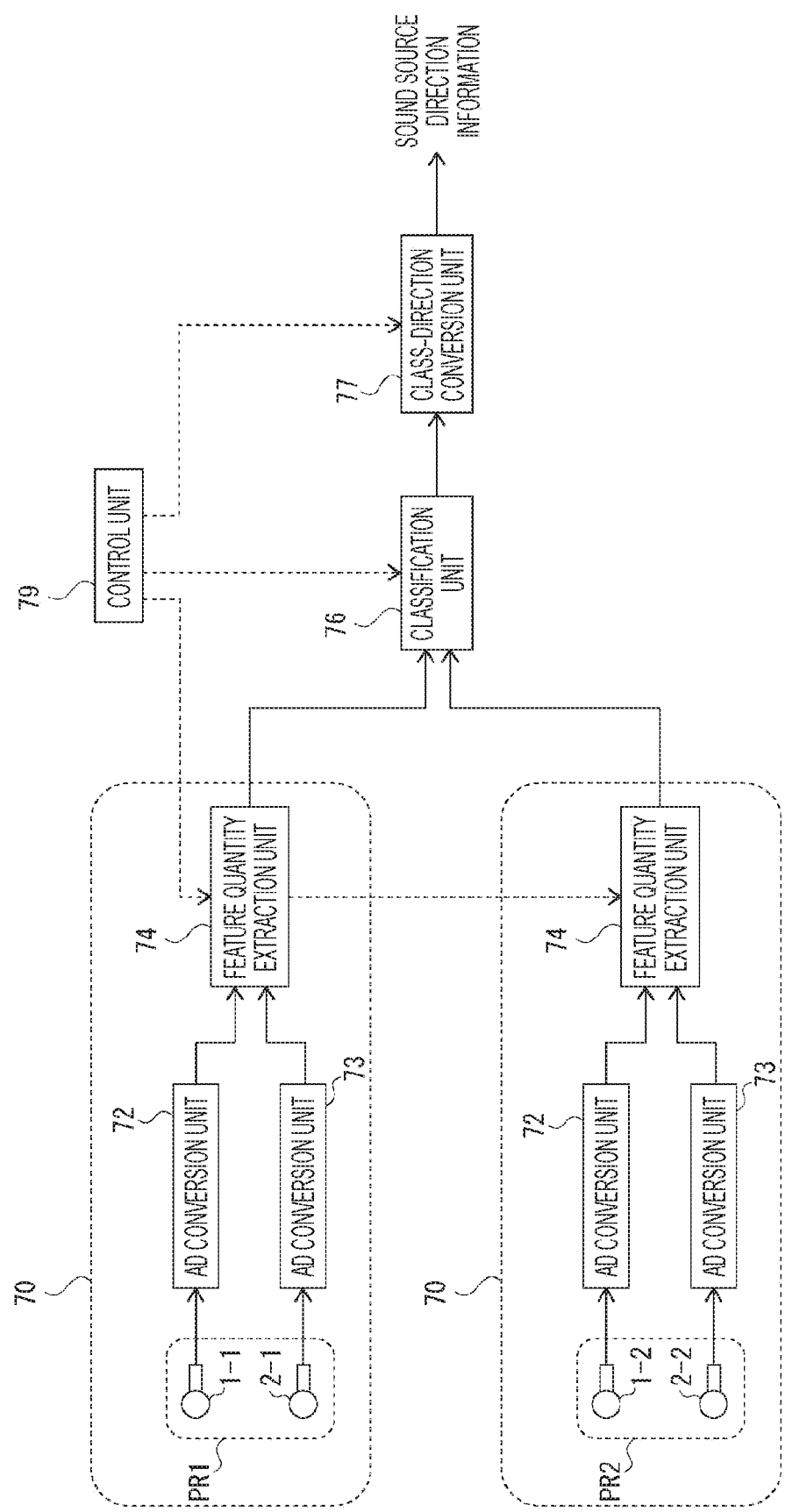
FIG. 7 is a block diagram of a configuration of a sound source direction estimation device of the embodiment.

FIG. 7 illustrates a configuration example of the sound source direction estimation device according to the embodiment.

The configuration in FIG. 7 is formed as a processing module of hardware or software in an information processing device such as a microcomputer for example.

FIG. 7 illustrates two module groups 70 prepared for each microphone pair PR.

The microphone pair PR is the pair of microphones 1 and 2 illustrated in FIG. 1.

In a case of FIG. 7, for example, a microphone pair PR1 is formed by microphones 1-1 and 2-1 and a microphone pair PR2 is formed by microphones 1-2 and 2-2.

A module group 70 is formed for each of these microphone pairs PR.

In a case where a plurality of microphone pairs PR is provided in this manner, the microphones 1-1, 1-2 . . . are collectively referred to as microphone 1, and the microphones 2-1, 2-2 . . . as microphone 2.

Each module group 70 is provided with two microphones 1 and 2, an AD conversion unit 72 and 73 connected to each of the microphones 1 and 2, and a feature quantity extraction unit 74. Details of the feature quantity extraction unit 74 will be described later.

In a case where the sound source direction estimation device includes a plurality of microphone pairs PR, the module group 70 having such a configuration is provided corresponding to each of the microphone pairs PR.

Figure 8A:
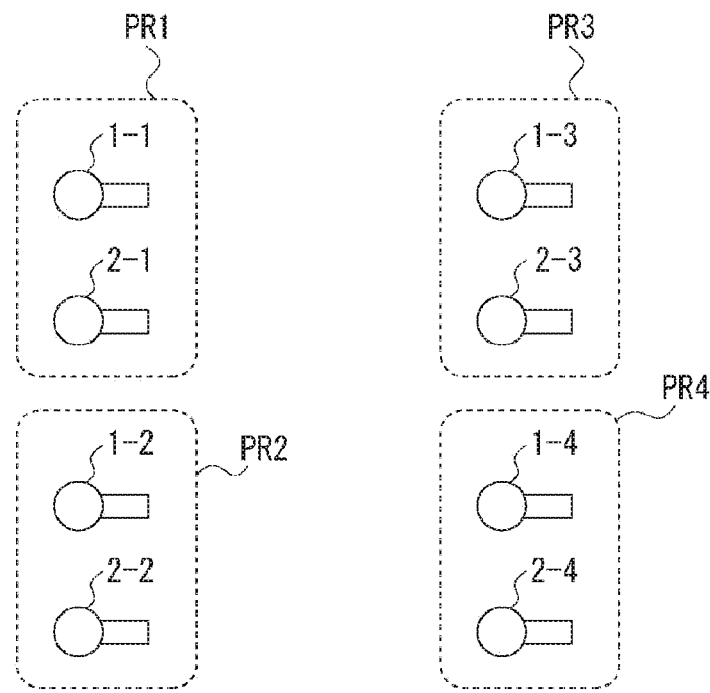
FIGS. 8A and 8B are explanatory diagrams of a microphone pair of the embodiment.

For example, FIG. 8A illustrates a case where eight microphones, microphones 1 (1-1, 1-2, 1-3, 1-4) and microphones (2-1, 2-2, 2-3, 2-4) are provided to thereby form microphone pairs PR1, PR2, PR3, and PR4.

In this case, four module groups 70 are formed to correspond to the microphone pairs PR1, PR2, PR3, and PR4, respectively.

Note that, as in the examples of FIGS. 7 and 8A, the number of microphones required for the entire device is basically twice the number of microphone pairs, but microphones may be shared between the microphone pairs PR.

Figure 8B:
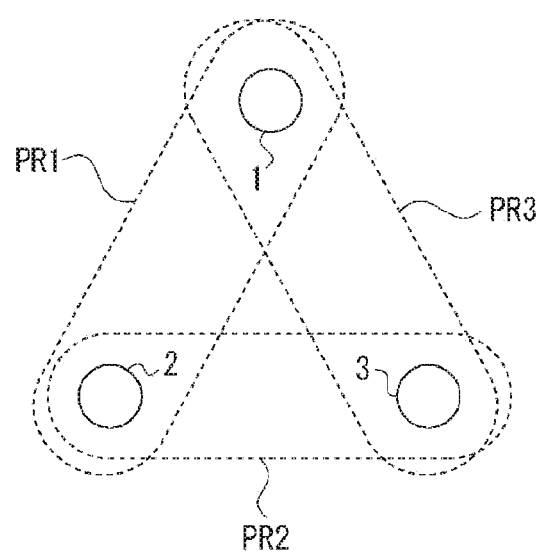

For example, FIG. 8B illustrates an example in which three microphone pairs PR1, PR2, and PR3 are formed by three microphones 1, 2, and 3.

By thus sharing one microphone by two microphone pairs, it is possible to reduce the number of microphones used in the entire device.

Also in the case of FIG. 8B, the module group 70 is formed for each of the microphone pairs PR1, PR2, and PR3.

Of course, in a case of forming the two module groups 70 as illustrated in FIG. 7, the microphone pairs PR1 and PR2 in FIG. 8B may be used. Therefore, in a case where the configuration in FIG. 7 is employed, it is sufficient if there are at least three microphones.

The classification unit 76 in FIG. 7 receives two types of feature quantities (IPD and single sound source mask) generated by the respective feature quantity extraction units 74 and classifies them into classes corresponding to sound source directions. In other words, a label indicating a sound source direction is given.

Specifically, as the classification unit 76, the binary relevance type multi-label classifier described in FIG. 4, the pruned set type multi-label classifier described in FIG. 5, or the like is used.

A class-direction conversion unit 77 converts a classification result of the classification unit 76 into sound source direction information. Details will be described later.

The modules as the feature quantity extraction unit 74, the classification unit 76, and the class-direction conversion unit 77 are controlled by a control unit 79.

Note that the above description has been made for a case of having a plurality of microphone pairs PR, but it is sufficient if at least one microphone pair PR is provided as the sound source direction estimation device of the present embodiment.

Figure 9:
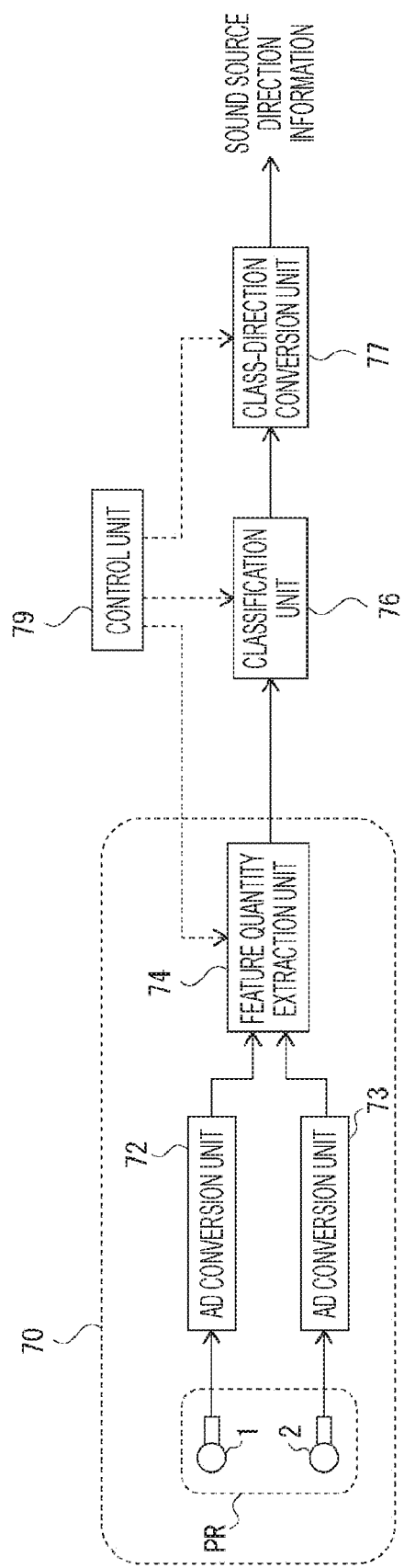
FIG. 9 is a block diagram of a configuration of the sound source direction estimation device of the embodiment.

A configuration in this case is as illustrated in FIG. 9, in which the module group 70 for the microphone pair PR by the microphones 1 and 2 is provided, and the feature quantity extraction unit 74 generates two types of feature quantities. Then, in this configuration, the classification unit 76 classifies them into a class corresponding to the sound source direction, and the class-direction conversion unit 77 obtains sound source direction information according to the classification result.

Next, details of the feature quantity extraction unit 74 will be described with reference to FIG. 10.

The input of the feature quantity extraction unit 74 is a signal (observed signal) output from the AD conversion units 72 and 73 connected to the two microphones 1 and 2, respectively. In the feature quantity extraction unit 74, these observed signals are input to short-time Fourier transform units 83 and 84.

The short-time Fourier transform units 83 and 84 apply short-time Fourier transform to observed signals, respectively, so as to generate observed signals in the time-frequency domain (observed signal spectrogram).

An observed signal buffer unit 85 stores the observed signals for a length of time required to generate a feature quantity.

The observed signal for $T_1$ frames is used in the IPD (see (Mathematical Formula 1)) and the observed signal for $T_2$ frames is used in a single sound source flag (see (Mathematical Formula 2)), and thus the observed signal with the larger number of frames is stored.

An inter-microphone phase difference calculation unit 86 calculates an inter-microphone phase difference.

A single sound source mask calculation unit 87 calculates the single sound source mask. That is, in the microphone pair PR, the degree that the number of sound sources is 1 is calculated for every frequency bin, and a single sound source mask indicating whether or not the component of a frequency band thereof is a single sound source is generated.

Next, the class-direction conversion unit 77 will be described with reference to FIGS. 11 and 12.

Basically, this module is a conversion table, and describes a correspondence relationship for converting a class ID output from the classification unit 76 into sound source direction information.

Since the class ID differs depending on the type of the classifier 76, the content of the conversion table depends on the type of the classifier 76.

FIG. 11 is a conversion table used as a set with the BR-DNN in FIG. 4. The BR-DNN has the same number of output units as the number of classifications of directions, and outputs the number of a unit having an output value exceeding a predetermined threshold value as a class ID.

Accordingly, the conversion table in FIG. 11 describes only one sound source direction information associated with each class ID.

FIG. 12 is a conversion table used as a set with the PS-DNN in FIG. 5. The number of output units of the PS-DNN depends on the number M of sound sources that can be estimated simultaneously. The PS-DNN outputs the number of the output unit with the maximum output value as the class ID. The class ID itself is one, but sound source directions associated therewith is 0 to M.

Accordingly, in the conversion table in FIG. 12, information of zero or more sound source directions is described for every class ID.

Note that in this diagram, the first class ID is a class corresponding to zero sound sources and a special value of "zero sound sources" is described, but it may simply be blank.

2-2 Process Example

A sound source direction estimation process in the sound source direction estimation device having the above configuration will be described with reference to a flowchart in FIG. 13.

This is a process executed by each module on the basis of control by the control unit 79.

Steps S101 to S104 are a loop for the microphone pair PR, and steps S102 and S103 are executed for the number of microphone pairs PR.

In an AD conversion process of step S102, the sound source direction estimation device converts an analog sound signal input to each of the microphones 1 and 2 forming the microphone pair PR into a digital sound waveform.

In a feature quantity extraction process of step S103, the sound source direction estimation device generates two types of feature quantities (IPD and single sound source mask) from observed signals of one frame or more. Details will be described later.

All feature quantities generated for every microphone pair PR in this manner are input to the DNN (classification unit 76), and classified in step S105. A class ID is obtained as a result of the classification.

Next, in step S106, the sound source direction estimation device converts each class ID into sound source direction information associated therewith.

When the process is to be continued, the process returns from step S107 to S101, and when the process is to be ended, the process ends at step S107.

Details of the feature quantity extraction in step S103 will be described with reference to a flowchart in FIG. 14.

In step S201, the sound source direction estimation device performs short-time Fourier transform on the observed signal waveform of each of the microphones 1 and 2 to generate an observed signal in the time-frequency domain (observed signal spectrogram). Details will be described later.

Next, in step S202, the sound source direction estimation device accumulates observed signals as much as necessary for subsequent feature quantity generation.

Using the observed signals thus accumulated, two types of feature quantities are calculated. That is, the sound source direction estimation device calculates the single sound source mask in step S203, and calculates the inter-microphone phase difference (IPD) in step S204.

Note that either of the two calculations of steps S203 and S204 may be performed first, or the two calculations may be performed in parallel. The calculation of the single sound source mask will be described later.

Details of the short-time Fourier transform in above step S201 will be described with reference to FIG. 15.

Figure 13:
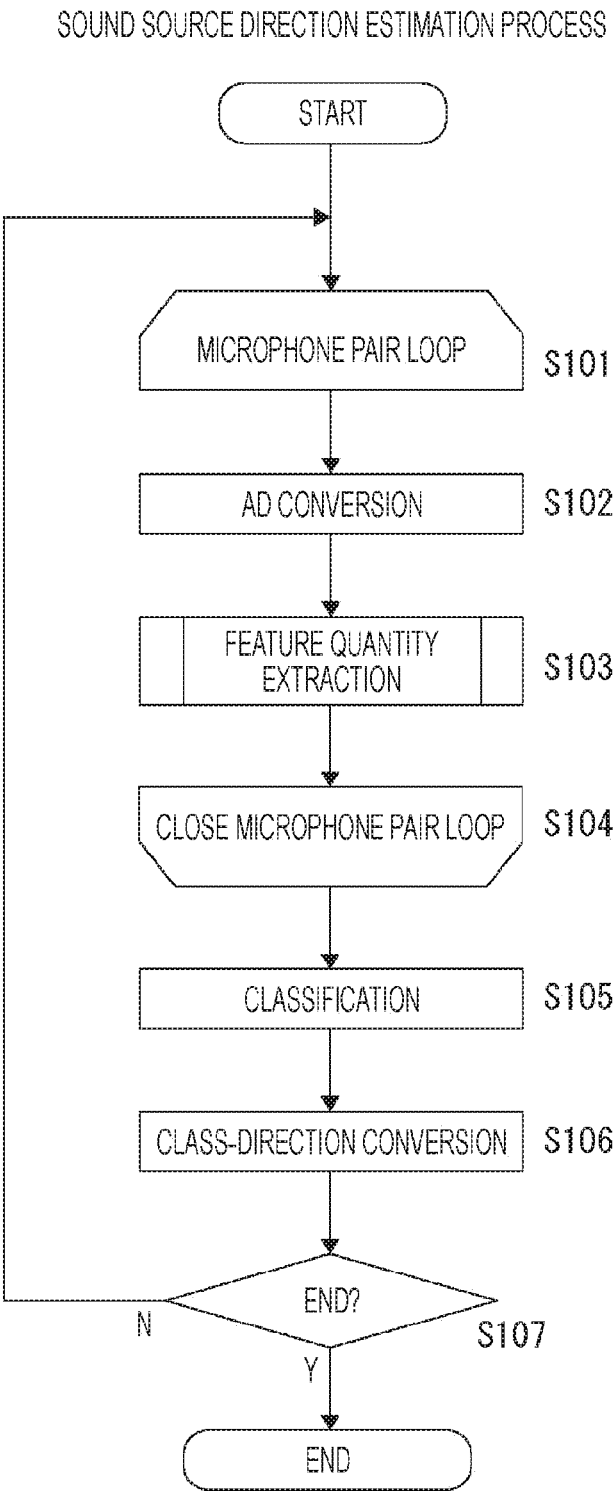
FIG. 13 is a flowchart of a sound source direction estimation process of the embodiment.
Figure 15:
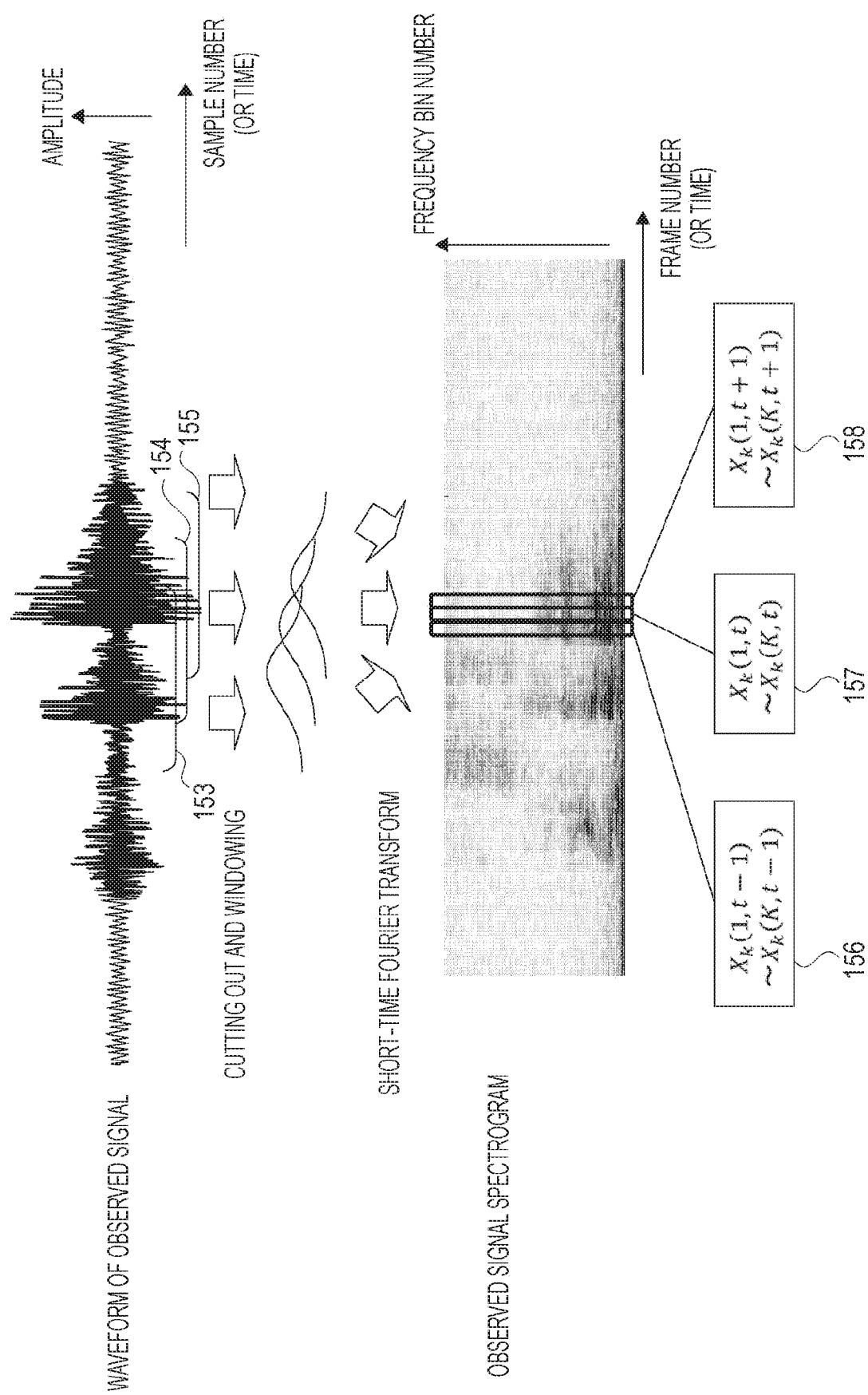
FIG. 15 is an explanatory diagram of short-time Fourier transform of the embodiment.

The waveform of the observed signal for each of the microphones 1 and 2 obtained by the AD conversion processing in step S102 in FIG. 13 is illustrated in an uppermost part of FIG. 15.

In the short-time Fourier transform, a fixed length is cut out from the waveform of the observed signal for each of microphones 1 and 2, and a window function such as Hanning window or Hamming window is applied to them.

This cut out unit is called a frame. In the diagram, a frame 154 is exemplified as a cutout range.

By applying the short-time Fourier transform to data for one frame, $X_k(1, t)$ to $X_k(K, t)$ is obtained as the observed signal 157 in the time-frequency domain. Here, k is the number of the microphone, t is the frame number, and K is the total number of frequency bins.

There may be an overlap between cut frames. For example, overlapping cut-out ranges such as frames 153 to 155 are set. In this manner, a change in the signal in the time-frequency domain becomes smooth between consecutive frames.

A data structure in which signals in the time-frequency domain are arranged in a time direction and a frequency direction is called a spectrogram. In the spectrogram illustrated, the horizontal axis represents the frame number and the vertical axis represents the frequency bin number, and observed signals 156 to 158 in the time-frequency domain are generated from frames 153 to 155, respectively.

Next, the calculation of the single sound source mask (step S203 in FIG. 14) will be described using a flowchart in FIG. 16.

In step S301, the sound source direction estimation device calculates a covariance matrix of the observed signals using above formula [2.2].

Next, in step S302, the sound source direction estimation device applies eigenvalue decomposition to the observed signal covariance matrix. The formula of eigenvalue decomposition is as represented in formula [2.3], but since the eigenvector is not used in calculation of the feature quantities, it is only required to calculate two eigenvalues $e_1(f, t)$ and $e_2(f, t)$ in formula [2.3].

Finally, the sound source direction estimation device calculates the mask value in step S302. The mask value is calculated using formula [2.4] in a case where a mask with two values (binary mask) is used. Furthermore, in a case where a mask with continuous values (soft mask) is used, formula [2.5] is used for calculation.

As described above with reference to FIGS. 13, 14, and 15, the sound source direction estimation processing is achieved in the sound source direction estimation device of the present embodiment.

2-3 Effect Verification

The present embodiment is characterized by the input feature quantity, and in addition to the inter-microphone phase difference (IPD), a single sound source mask representing whether or not there is one sound source is also calculated for every frequency, and both of them are input to the multi-label classifiers, to thereby perform direction estimation of a plurality of sound sources.

It has been confirmed through an experiment that a single sound source mask is effective for direction estimation of a plurality of sound sources, and this effect will be illustrated as an effect of the embodiment.

A multi-label classifier used in the experiment is the PS-DNN in FIG. 5. Estimated directions are 37 directions that are divided from −90° to 90° in 5° steps.

The maximum number of sound sources that can be estimated simultaneously is 2, and the number of units in the output layer is 704. The number of units in the input layer is 257×2=514, which originates in that 512-point STFTs generate 257 frequency bins.

There are two intermediate layers, the number of units is 257 for the both, and an activation function is a rectified linear unit (ReLU).

The single sound source mask was binary and a threshold value ($\alpha$ in formula [2.4]) of 0.1 was used.

The total number of pieces of learning data is 2.34 million samples, and a breakdown for every number of sound sources is illustrated in Table 3 below.

TABLE 3

|  | NUMBER OF SAMPLES | NUMBER OF SAMPLES PER CLASS |
| --- | --- | --- |
| 0 SOUND SOURCES | 24000 | 24000 |
| 1 SOUND SOURCE | 888000 | 24000 |
| 2 SOUND SOURCES | 1428000 | APPROXIMATELY 2144 |

Note that in generation of learning data of two sound sources, in a case where classes associated with respective sound source directions are located next or second next to each other, they are excluded from the learning data. For example, a combination of 90° and 75° is included in the learning data, but a combination of 90° and 85° and a combination of 90° and 80° are excluded from the learning data.

When it is not excluded, the learning data of the two sound sources is 1,598,400 samples, and the number of samples per class is 2,400.

Figure 17:
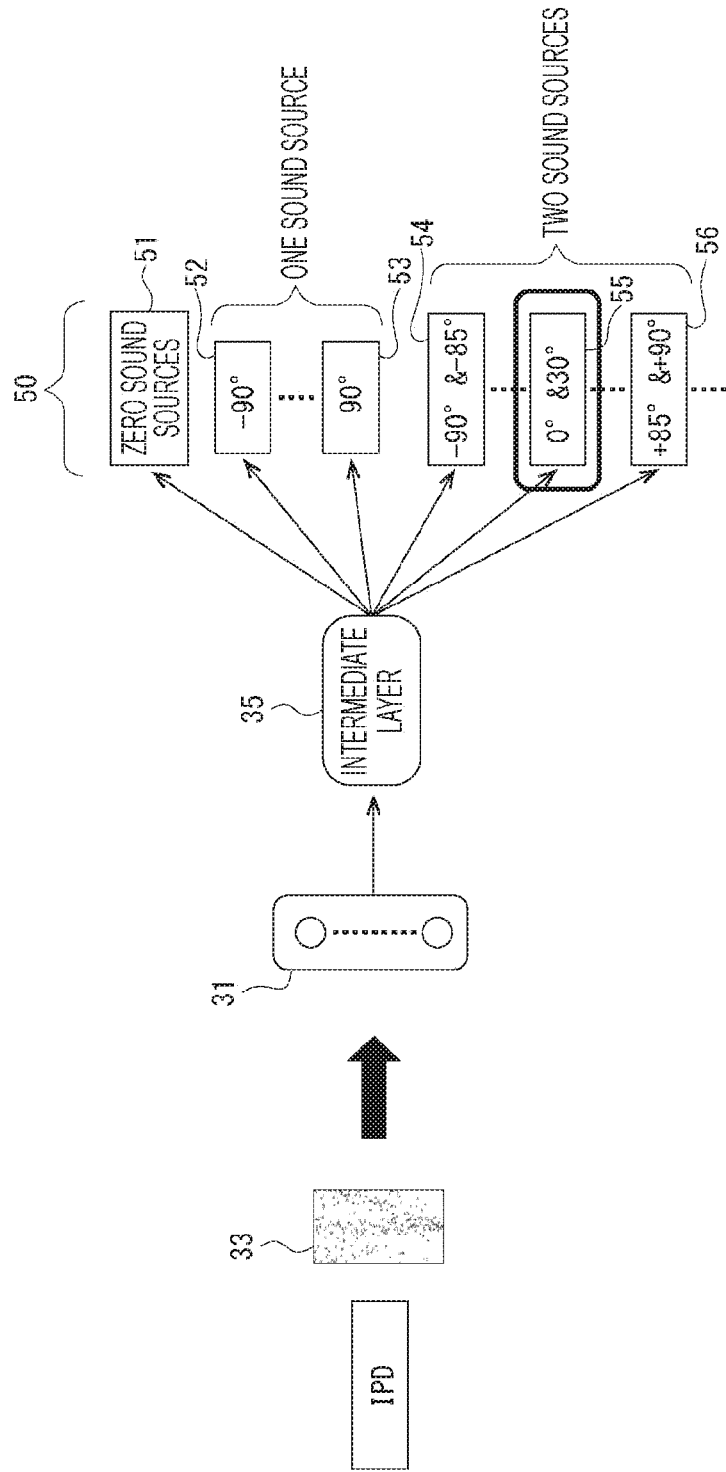
FIG. 17 is an explanatory diagram of a PS-DNN of a comparative example.

For comparison, as illustrated in FIG. 17, a DNN having only the IPD as an input feature quantity was prepared. The difference between this DNN and FIG. 5 is only the input feature quantities. That is, only a unit for inputting the IPD 33 exists as the unit group 31 of the input layer, and a unit for inputting the single sound source mask does not exist. On the other hand, the intermediate layers 35 and the output layer 50 are the same as those in FIG. 5.

It can be said that this sound source direction estimation using the DNN as a comparative example is a combination of the method using the IPD as the input feature quantity (Patent Documents 1 and 2) and the sound source direction estimation using the DNN-based multi-label classifier (Non-Patent Documents 5, 6, and 9).

Figure 18:
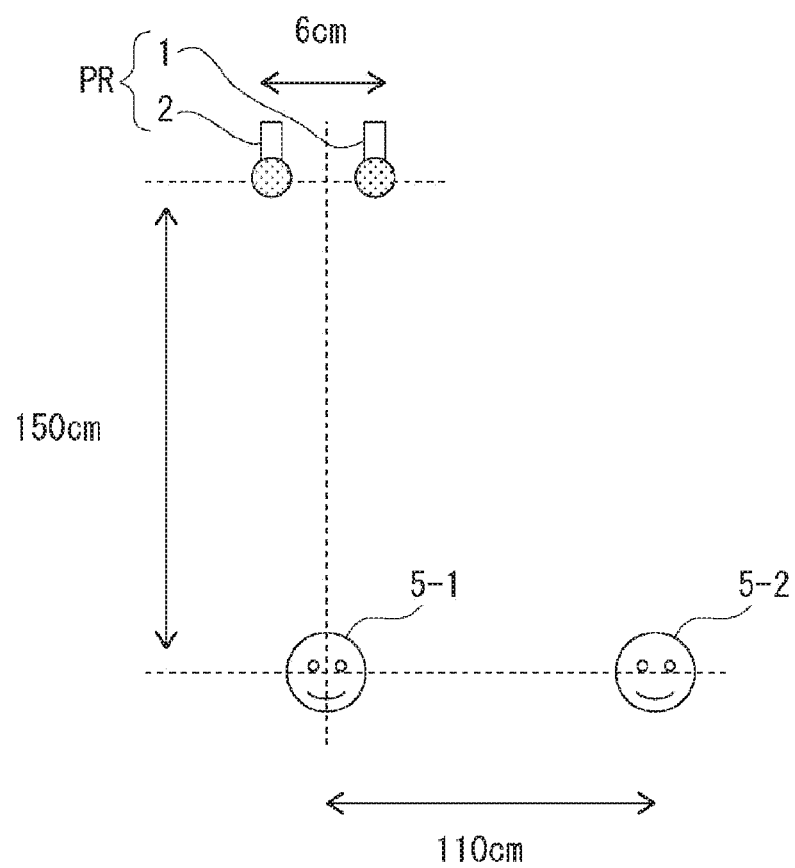
FIG. 18 is an explanatory diagram of setting of an evaluation experiment.

Next, an environment in which test data used in the experiment is recorded will be described with reference to FIG. 18. In a recording studio, two microphones 1 and 2 were installed 6 cm apart. A speaker (sound source 5-1) was installed at a point 150 cm away from a midpoint of the microphone pair PR, another speaker (sound source 5-2) was installed at a point 110 cm away from the middle point of the microphone pair PR, and different sounds are reproduced from the respective speakers.

The sound source direction seen from the midpoint of the microphone pair PR is 0° for the sound source 5-1 and about 36° for the sound source 5-2. One utterance was reproduced from the sound source 5-1 and 60 utterances were reproduced from the sound source 5-2 (there are six speakers, three males and three females, and 10 utterances by every speaker).

Recording was done at 16 kHz and 16 bit. Waveforms of observed signals were generated by recording every sound source and then mixing them on a computer later.

The utterances of the sound source 5-1 are longer than any of the utterances of the sound source 5-2, and thus the observed signal has a part in which only the sound source 5-1 exists and a part in which both the sound sources are mixed.

The feature quantities were generated with the following settings for the sound data thus recorded.

Number of STFT points: 512 samples (32 ms)
Shift width: 160 samples (10 ms)
Number of frequency bins: 257
Number of IPD frames ($T_1$ in formula [1.3]): 10, 15, 20, 25, 30
Number of frames of covariance matrix ($T_2$ in formula [2.2]): same as $T_1$
Threshold value of single sound source mask (a in formula [2.4]): 0.1

Next, an example of experimental results will be described with reference to FIGS. 19A, 19B, and 19C.

Figure 19:
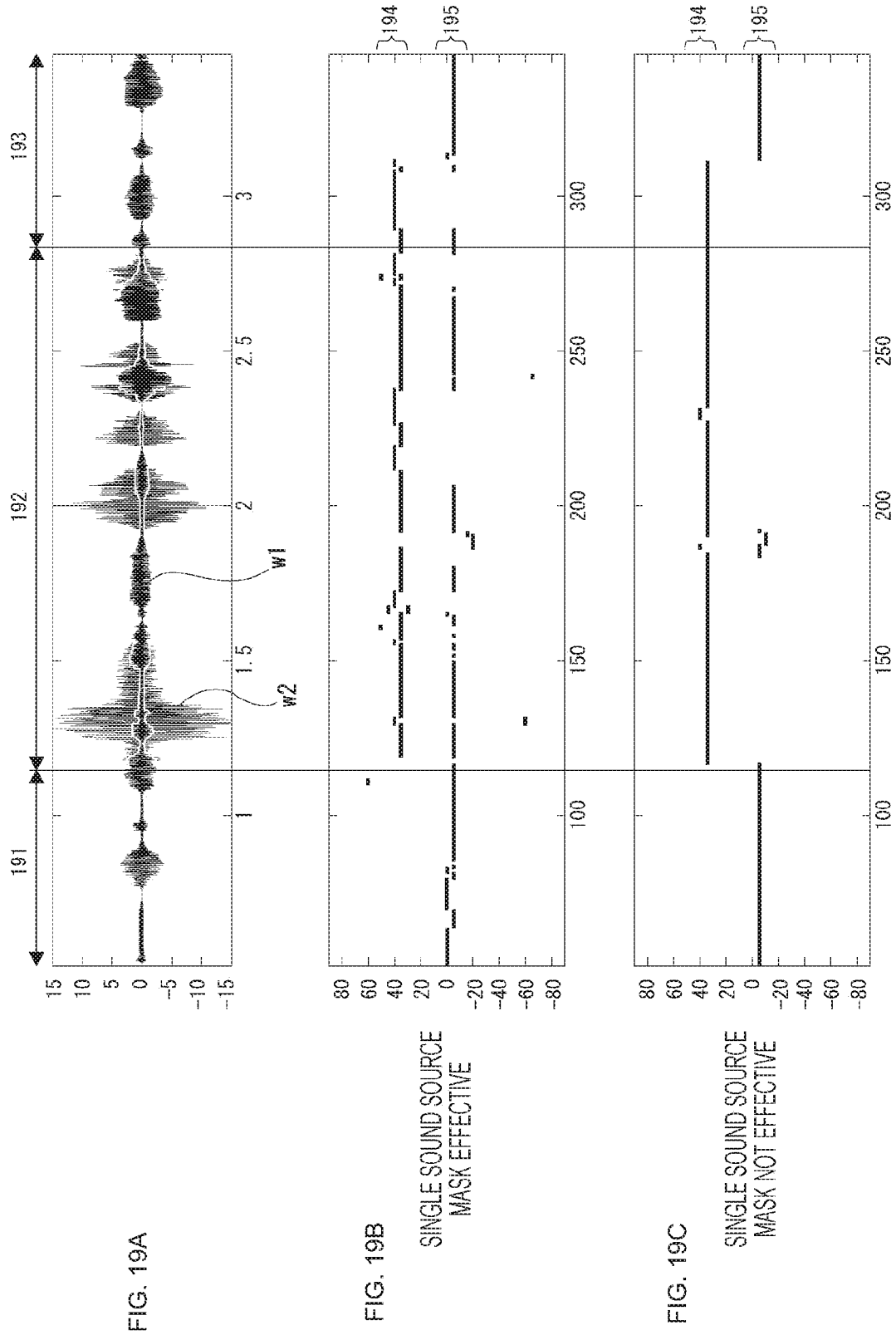
FIGS. 19A, 19B, and 19C are explanatory diagrams of an example of an experimental result.

In FIG. 19A, waveforms of recorded signals for every sound source are superimposed and plotted, with the vertical axis representing amplitude and the horizontal axis representing time. Since two microphones 1 and 2 were used for recording, there is another pair of waveforms almost similar to this. A waveform w1 is a waveform of the sound source 5-1 and a waveform w2 is a waveform of the sound source 5-2, and these are superimposed and illustrated.

The sound source 5-1 is sounding almost all the time from the left end to the right end of the time axis, while the sound source 5-2 is sounding only in a period 192. Therefore, in the observed signal, both sound sources (that is, two sound sources) exist in the period 192, but only the sound source 5-1 exists in periods 191 and 193.

FIG. 19B is a direction estimation result using the PS-DNN in FIG. 5, and corresponds to the method of the present embodiment.

In this plot, the vertical axis represents an estimated direction (degrees), the horizontal axis represents a frame number (0.01 seconds per frame), and a sound source direction estimated in each frame is represented by dots. In this plot, there are dots in a section 195 near 0°, which is the direction of the sound source 5-1, in most of the frames. On the other hand, in the period 192, there are also dots in a section 194 near 36°, which is the direction of the sound source 5-2. That is, it can be seen that in the period 192 in which the two sound sources are mixed, both two sound source directions are estimated almost correctly.

Note that there are dots in the section 194 near 36° even in a part of the period 193 (near the left end) because the observed signal for 30 frames is used in this plot to calculate the feature quantity. That is, even if the sound source 5-2 stops sounding, for up to 30 frames, the influence remains and thus the direction of the sound source 5-2 may be output.

In the period 191 and the period 193, which are periods in which only the sound source 5-1 exists, there is only one dot in most of the frames except near the left end of the period 193 described above, and the value thereof is in the section 195 near 0°. That is, it can be seen that the achievement can also be made by changing the number of estimated directions according to the number of sound sources.

On the other hand, FIG. 19C is the direction estimation result using the PS-DNN of the comparative example in FIG. 17.

In this plot, although there are two sound sources in the period 192, in most of the frames, only the dot in the section 194 near 36° corresponding to the direction of the sound source 5-2 is estimated. In other words, the dot in the section 195 around 0° corresponding to the direction of the sound source 5-1 exists in the periods 191 and 193, but hardly exists in the period 192. That is, it can be seen that the direction estimation of two sound sources has failed and only one sound source is estimated.

For evaluation, correct answer rates in the directions of the sound source 5-1 and the sound source 5-2 are calculated by formulas [4.1] and [4.2] in the following (Mathematical Formula 4), respectively.

[Mathematical Formula 4]

$$\text{CORRECT ANSWER RATE (SOUND SOURCE 5-1)} = \frac{\text{NUMBER OF FRAMES IN WHICH DIRECTION CORRESPONDING TO SOUND SOURCE 5-1 IS OUTPUT}}{\text{NUMBER OF FRAMES IN WHICH TWO SOUND SOURCES EXIST}} \quad [4.1]$$

-continued $$\text{CORRECT ANSWER RATE (SOUND SOURCE 5-2)} = \frac{\text{NUMBER OF FRAMES IN WHICH DIRECTION CORRESPONDING TO SOUND SOURCE 5-2 IS OUTPUT}}{\text{NUMBER OF FRAMES IN WHICH TWO SOUND SOURCES EXIST}} \quad [4.2]$$

The "number of frames in which two sound sources exist" in these formulas corresponds to the number of frames in the period 192 in FIGS. 19A, 19B, and 19C. However, the correct answer rate is not calculated for every utterance, but is calculated using the total number of frames for all 60 utterances.

In formula [4.1], it was determined with a margin of 7.5 degrees whether or not the output direction corresponds to the sound source 5-1 (0°). Since the output is in 5° steps, if any of −5°, 0°, or 5° is output, it is assumed as a correct answer.

Also for the sound source 5-2 (36°), if any of 30°, 35°, or 40° is output, it is similarly assumed as a correct answer.

FIG. 20 illustrates results of totaling all 60 utterances.

Column 201 represents the number of frames used in the calculation of IPD ($T_1$ in formula [1.3]).

Since $T_1=T_2$ in this experiment, the covariance matrix for the single sound source mask is also calculated with the same number of frames.

Columns 202 and 203 are related to the method using both the IPD and the single sound source mask of the present embodiment as input feature quantities, and represent the correct answer rates of directions of the sound source 5-1 and the sound source 5-2, respectively.

Columns 204 and 205 are related to the method using only the IPD of the comparative example as an input feature quantity, and represent the correct answer rates of directions of the sound source 5-1 and the sound source 5-2, respectively.

Comparing the present embodiment with the comparative example, the both have correct answer rates of 80% or more for the sound sources 5-2, and the comparative example is rather more accurate. On the other hand, for the sound source 5-1, conversely, the correct answer rate is generally 50% or more in the present embodiment, but is 16.8% at the maximum when $T_1=10$ in the comparative example.

That is, it was confirmed that, in an environment in which two sound sources are simultaneously sounding, the method of the present embodiment succeeds in estimating the directions of two sound sources in at least half of the frames, whereas only the direction of one sound source is estimated in the comparative example.

As described above, in the present disclosure, the single sound source mask is also used as an input feature quantity in addition to the IPD, and by classifying them with the multi-label classifier, correct estimation is possible even when direction estimation of a plurality of sound sources has been difficult.

2-4 Modification Example

If the same number of frames is used in calculation of two types of input feature quantities, the configuration can be simplified. This point will be described below.

Regarding the two types of feature quantities, the IPD is calculated from $T_1$ frames using formula [1.3], and the single sound source mask is calculated from $T_2$ frames using formula [2.2] or the like. The same value may be used for $T_1$ and $T_2$. Then, brackets in formula [1.3] match an upper right element of the covariance matrix cov(f, t) in formula [2.2].

Therefore, in this case, part of the process of calculating the two types of feature quantities can be shared. That is, after calculating the covariance matrix by formula [2.2], the single sound source mask is calculated by eigenvalue decomposition or the like, and also the IPD is calculated by calculating an argument for an upper right element of the covariance matrix.

Alternatively, the argument for a lower left element of the covariance matrix may be calculated, and then the sign may be reversed.

Figure 10:
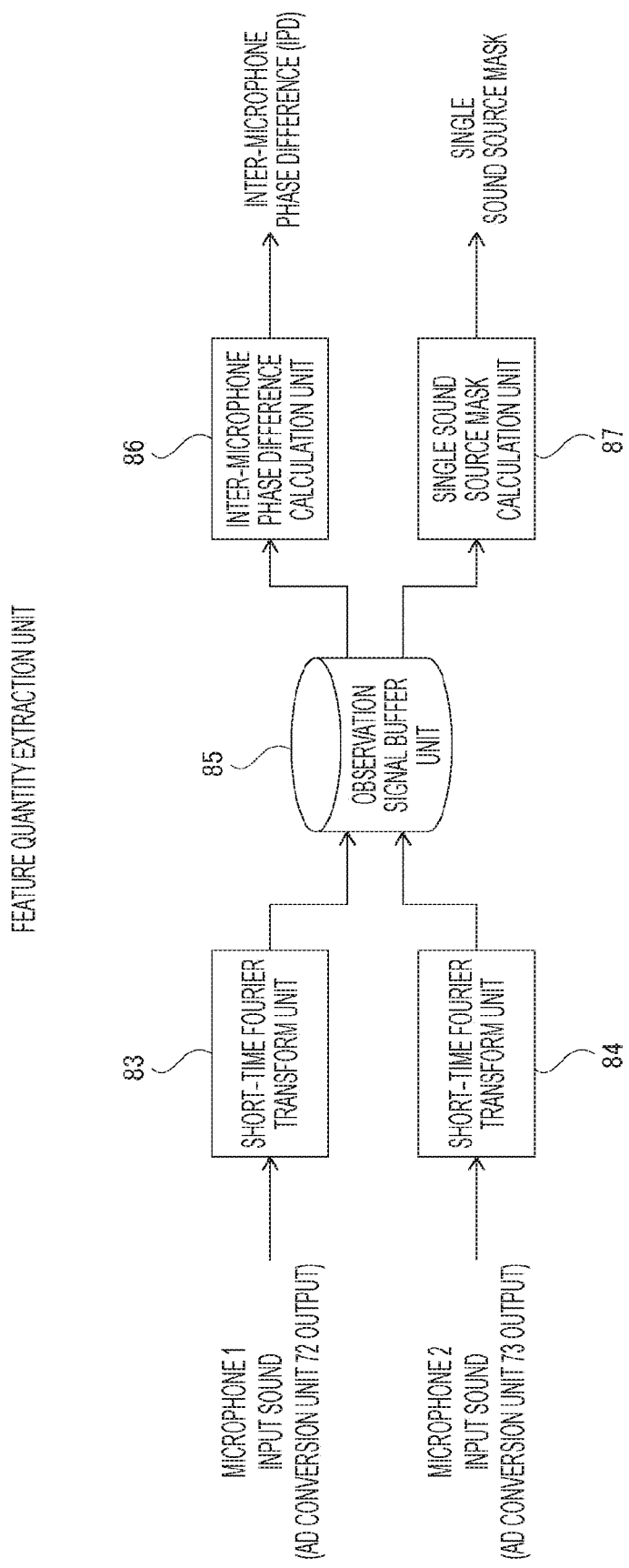
FIG. 10 is a block diagram of a feature quantity extraction unit of the embodiment.

Furthermore, on the configuration diagram, in FIG. 10, the inter-microphone phase difference calculation unit 86 and the single sound source mask calculation unit 87 may be integrated to one module, and this module may output both the IPD and the single sound source mask.

3. Summary

Although the embodiments have been described above, the sound source direction estimation device according to the embodiments has the following features and effects.

The sound source direction estimation device according to the embodiment includes an inter-microphone phase difference calculation unit 86 (phase difference calculation unit) that calculates an inter-microphone phase difference for every frequency band in a microphone pair PR including two microphones 1 and 2 that are installed apart from each other by a predetermined distance, and a single sound source mask calculation unit 87 that calculates, for every frequency band in the microphone pair PR, a single sound source mask indicating whether or not a component of the frequency band is a single sound source. Furthermore, the sound source direction estimation device includes a classification unit 76 (multi-label classifier) that inputs an inter-microphone phase difference and a single sound source mask as feature quantities, and outputs a direction label associated with a sound source direction to the feature quantities.

That is, the inter-microphone phase difference calculated for the microphone pair and the single sound source mask are input to the multi-label classifier to determine zero or more sound source directions.

Thus, by using not only the inter-microphone phase difference but also the single sound source mask as a feature quantity, components of a time-frequency bin in which there is no sound or two or more sound sources are present are ignored. Consequently, it becomes easy to learn correspondence between input feature quantities and sound source directions even with a small amount of learning data, and it becomes possible to estimate a plurality of and highly accurate sound source directions.

The sound source direction estimation device of the embodiment further includes a class-direction conversion unit 77 (conversion unit) that converts the direction label output by the classification unit 76 into sound source direction information indicating a sound source direction.

Therefore, information of the direction label by the classification unit 76 which is a multi-label classifier is converted into the sound source direction information, and the sound source direction can be interpreted at an output destination. That is, estimated sound source direction information can be output accurately.

In the embodiment, as illustrated in FIG. 9, the example has been given in which the feature quantity extraction unit 74 (inter-microphone phase difference calculation unit 86 and single sound source mask calculation unit 87) performs calculation on inputs from one microphone pair 1, 2.

As described above, the sound source direction estimation device according to the embodiment can be achieved as a device that can accurately determine sound source directions of a plurality of sound sources corresponding to inputs from at least two microphones 1 and 2.

The example has been described in which the single sound source mask calculation unit 87 of the embodiment generates a covariance matrix in a time-frequency domain from input signals of a predetermined time length from the microphone pair PR, obtains an eigenvalue of the covariance matrix, and takes as the single sound source mask a binary mask calculated by using as a mask value a binary value about whether or not a ratio of a minimum eigenvalue and a maximum eigenvalue is below a predetermined threshold value.

In a case where only one sound source exists, a minimum eigenvalue $e_1(f, t)$ is quite small compared to a maximum eigenvalue $e_2(f, t)$, and in a case where two or more sound sources exist, the minimum eigenvalue $e_1(f, t)$ takes a value close to the maximum eigenvalue $e_2(f, t)$. Furthermore, also in a case of no sound, the minimum eigenvalue $e_1(f, t)$ takes a value close to the maximum eigenvalue $e_2(f, t)$ as in a case of two or more sound sources. This is used to generate a single sound source mask.

Thus, as in above formula [2.4], the binary value about whether or not the ratio of the minimum eigenvalue $e_1(f, t)$ and the maximum eigenvalue $e_2(f, t)$ is below a predetermined threshold value α can be taken as a value of the single sound source mask.

Furthermore, in the embodiment, the example has been described in which the single sound source mask calculation unit 87 calculates a covariance matrix in a time-frequency domain from an input signal of a predetermined time length from the microphone pair PR, obtains an eigenvalue of the covariance matrix, and takes as the single sound source mask a soft mask calculated by using as a mask value a value of zero or more and one or less calculated on the basis of the ratio of a minimum eigenvalue and a maximum eigenvalue. More specifically, a soft mask calculated by using a value obtained by subtracting the ratio of the minimum eigenvalue and the maximum eigenvalue from a predetermined constant as the mask value is taken as a single sound source mask.

That is, the value obtained by subtracting the ratio of the minimum eigenvalue $e_1(f, t)$ and the maximum eigenvalue $e_2(f, t)$ from the predetermined constant ("1") as in above formula [2.5] can be taken as a value of the single sound source mask.

In the embodiment, the example has been described in which the classification unit 76 (multi-label classifier) includes the same number of binary classifiers as the number of classifications of directions, each of the binary classifiers is associated with each direction, and when a feature quantity is input, zero or more binary classifiers corresponding to a direction in which a sound source exists output true values, and a direction label associated with the binary classifier that has output the true value is output as a sound source direction.

That is, a classifier called binary relevance is used as the multi-label classifier.

In this case, as illustrated in FIG. 4, the direction in which the sound source exists is determined by a unit that has ignited (output value of the unit exceeds a threshold value). That is, a direction label associated with the unit can be output as a sound source direction.

In this case, the classification unit 76 has the following features.

It is a neural network and includes one input layer, one output layer, and one or more intermediate layers.

The input layer includes a unit that inputs the inter-microphone phase difference for every frequency and a unit that inputs the single sound source mask for every frequency.

The output layer includes the same number of units as the number of classifications of directions, and each unit is associated with a different direction.

Data input to the input layer is propagated to the output layer, and only when a value of each unit in the output layer exceeds a predetermined threshold value, the unit is considered to have ignited.

A direction label associated with the unit that has ignited is output as a sound source direction.

With this configuration, a binary relevance multi-label classifier for sound source direction estimation can be specifically configured.

Furthermore, in the embodiment, the example has been described in which the classification unit 76 (multi-label classifier) includes the same number of classification classes as the total number of combinations of zero or more and M or less directions different from each other where M is an upper limit of the number of sound sources for which estimation is possible, each class is associated with zero or more sound source directions, when a feature quantity is input, the feature quantity is classified into one of the classes, and zero or more direction labels associated with the classified classes are output as sound source directions.

That is, a classifier called a pruned set is used as the multi-label classifier.

In this case, as described in FIG. 5, after propagating data in the input layer to the output layer, a unit with a maximum output value in the output layer is searched for, and a label associated with this unit can be assumed as a sound source direction.

In this case, the classification unit 76 has the following features.

It is a neural network and includes one input layer, one output layer, and one or more intermediate layers.

The input layer includes a unit that inputs the inter-microphone phase difference for every frequency and a unit that inputs the single sound source mask for every frequency.

The output layer includes the same number of units as the total number of combinations of zero or more and M or less different directions, and each of the units is associated with zero or more sound source directions.

Data input to the input layer is propagated to the output layer and one with a maximum value is selected among units of the output layer.

Zero or more direction labels are associated with the selected unit as a sound source direction.

With this configuration, a pruned set multi-label classifier for sound source direction estimation can be specifically configured.

In the embodiment, the example has been described in which the inter-microphone phase difference calculation unit 86 and the single sound source mask calculation unit 87 perform calculation on inputs from a plurality of microphone pairs.

That is, as described with reference to FIGS. 7 and 8, it is possible to achieve a sound source direction estimation device that can accurately determine sound source directions of a plurality of sound sources corresponding to inputs from a plurality of microphone pairs PR.

Furthermore, in this case, as described with reference to FIG. 8B, at least two microphone pairs of the plurality of microphone pairs can share one microphone of each of the microphone pairs.

In this manner, sound source direction estimation using the sound source direction estimation device of the embodiment can be achieved without necessarily requiring the number of microphones twice as many as the number of microphone pairs PR.

As a modification example of the embodiment, it has been described that the inter-microphone phase difference calculation unit 86 calculates an argument of a complex number for an upper right or lower left element of the covariance matrix generated in calculation of the single sound source mask by the single sound source mask calculation unit 87, and takes a value thereof as the inter-microphone phase difference.

That is, the inter-microphone phase difference is also calculated from the covariance matrix. Thus, the calculation process of the inter-microphone phase difference can be made efficient.

Figure 14:
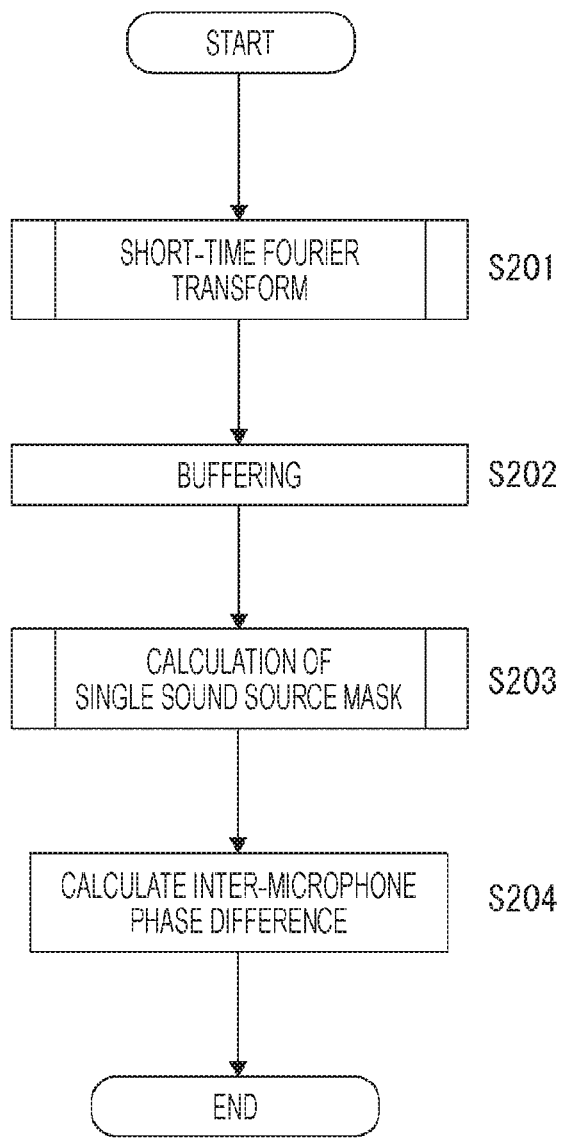
FIG. 14 is a flowchart of a feature quantity extraction process of the embodiment.
Figure 16:
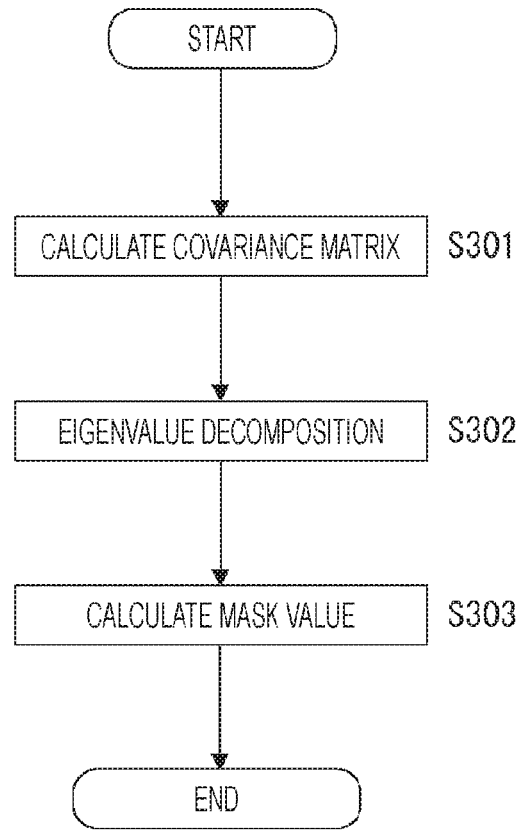
FIG. 16 is a flowchart of a single sound source mask calculation process of the embodiment.

A program of the embodiment is a program that causes, for example, an information processing device such as a central processing unit (CPU), a digital signal processor (DSP), or the like or a computer device including them to execute processes in FIGS. 13, 14, and 16 illustrated in the above-described embodiment.

That is, the program of the embodiment is a program that causes an information processing device to execute a process of calculating an inter-microphone phase difference for every frequency band in a microphone pair PR including two microphones 1 and 2 that are installed apart from each other by a predetermined distance, a process of calculating, for every frequency band in the microphone pair PR, a single sound source mask indicating whether or not a component of the frequency band is a single sound source, and a process of inputting the calculated inter-microphone phase difference and the calculated single sound source mask to a multi-label classifier, and outputting a direction label associated with a sound source direction to the feature quantities.

With such a program, it is possible to achieve an information processing device that performs the sound source direction estimation described above.

Such a program can be recorded in advance in a hard disk drive (HDD) as a recording medium built in a device such as a computer device, a read only memory (ROM) in a microcomputer having a CPU, or the like.

Alternatively, the program can also be temporarily (or permanently) stored (recorded) in a removable recording medium such as a flexible disc, a compact disc read only memory (CD-ROM), a magnet optical (MO) disc, a digital versatile disc (DVD), a Blu-ray disc (registered trademark), a magnetic disc, a semiconductor memory, a memory card, or the like. Such a removable recording medium can be provided as what is called package software.

Furthermore, such a program can be installed from the removable recording medium into a personal computer or the like, or can be downloaded from a download site via a network such as a local area network (LAN) or the Internet.

Furthermore, such a program is suitable for providing a wide range of information processing devices that function as the sound source direction estimation device according to the embodiment. For example, by performing processing based on this program in a personal computer, a portable information processing device, a mobile phone, a terminal device, a game device, a video device, an audio device, an imaging device, a personal digital assistant (PDA), a conversational interface device, an agent device, a robot, a voice detection device, a home electric appliance, or the like, these devices can be made to function as the sound source direction estimation device of the present disclosure.

Furthermore, the configurations in FIGS. 7 and 9 may be distributed to a plurality of information processing devices instead of being a single information processing device.

As what is called cloud computing, an input by the microphone pair PR in a terminal device can be converted into digital data and then transmitted to a cloud server. On the cloud server side, a configuration is also conceivable that includes components as the feature quantity extraction unit 74 having the inter-microphone phase difference calculation unit 86 and the single sound source mask calculation unit 87, the classification unit 76, and further the class-direction conversion unit 77, and returns sound source direction information obtained as a result to the terminal device.

Then, the sound source direction estimation by the technique of the present embodiment becomes possible by cooperation of a device including at least one microphone pair PR and the cloud server.

Figure 21:
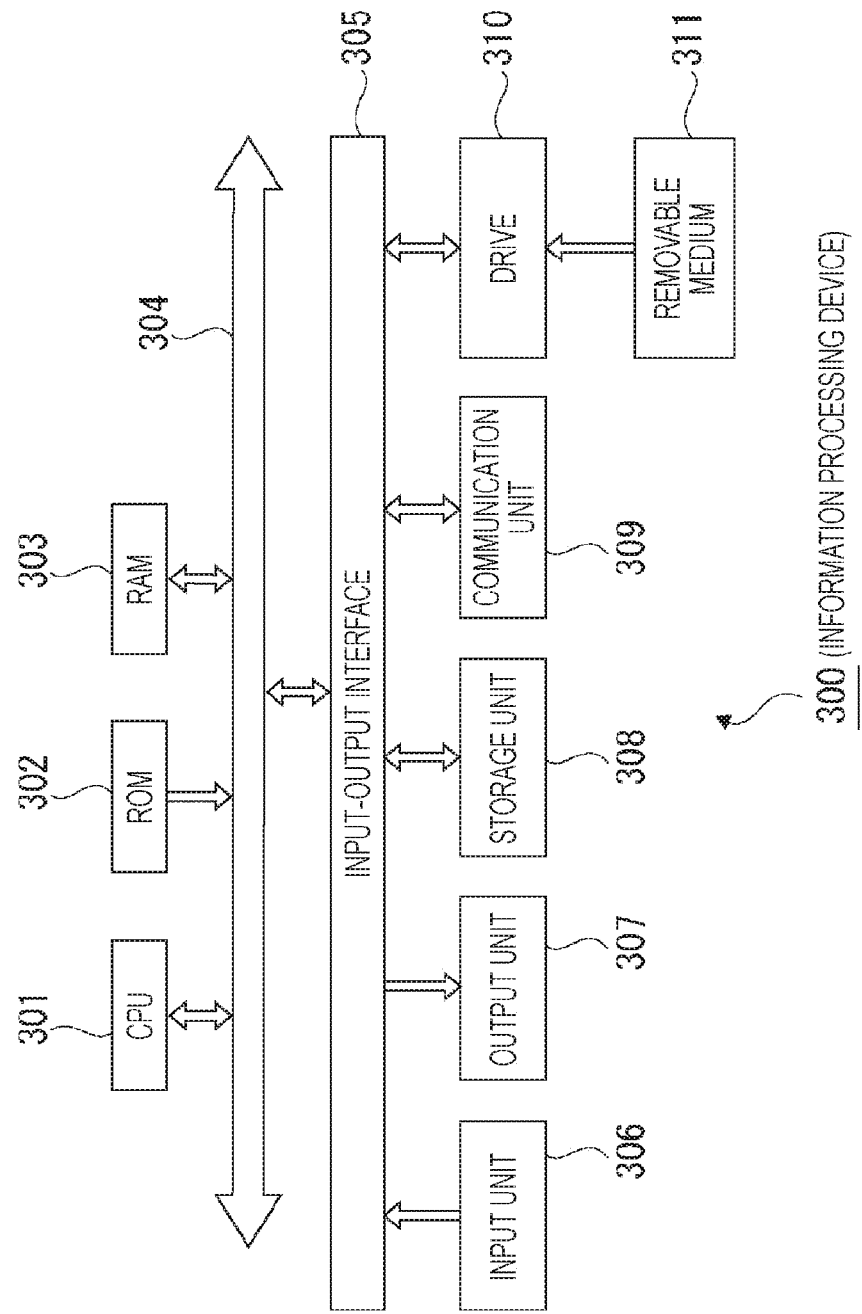
FIG. 21 is a block diagram of an information processing device.

FIG. 21 illustrates a configuration example of an information processing device 300 that can function as the sound source direction estimation device of the present technology.

In FIG. 21, a CPU 301 of the information processing device 300 executes various processes according to a program stored in a ROM 302 or a program loaded from a storage unit 308 to a random access memory (RAM) 303. The RAM 303 also appropriately stores data necessary for the CPU 301 to execute various processes, and the like.

The CPU 301, the ROM 302, and the RAM 303 are connected to each other by a bus 304. An input-output interface 305 is also connected to the bus 304.

An input unit 306 including a microphone, a keyboard, a mouse, or the like, an output unit 307 including a display having an LCD or an organic EL panel or the like, a speaker, and the like, a storage unit 308 including a hard disk or the like, and a communication unit 309 including a modem or the like are connected to the input-output interface 305. The communication unit 309 performs communication processing via a network including the Internet.

A drive 310 is also connected to the input-output interface 305 as needed, a removable medium 311 such as a magnetic disk, an optical disk, a magneto-optical disk, or a semiconductor memory is appropriately mounted thereon, and a computer program read from them is installed in the storage unit 308 as needed.

In a case where the above-mentioned sound source direction estimation processing is executed by software, a program forming the software is installed from a network or a recording medium.

This recording medium includes a removable medium 311 that is distributed in order to distribute the program to the user and that includes a magnetic disk, an optical disk, a magneto-optical disk, or a semiconductor memory, or the like on which the program is recorded. Alternatively, it also includes a ROM 302 in which a program is recorded, a hard disk included in the storage unit 308, or the like which is distributed to a user in a state of being incorporated in a device main body in advance.

Such information processing device 300 as described above includes, for example, the microphone pair PR as the input unit 306 and the AD conversion unit 72 for input voice thereof. Then, the CPU 301 executes processing of the feature quantity extraction unit 74, the classification unit 76, the class-direction conversion unit 77, and the control unit 79 according to a program. In this manner, the information processing device 300 can be made to function as the sound source direction estimation device.

Note that effects described in the present description are merely examples and are not limited, and other effects may be provided.

Note that the present technology can employ configurations as follows.

(1)

A sound source direction estimation device, including:

a phase difference calculation unit that calculates an inter-microphone phase difference for every frequency band in a microphone pair including two microphones that are installed apart from each other by a predetermined distance;

a single sound source mask calculation unit that calculates, for every frequency band in the microphone pair, a single sound source mask indicating whether or not a component of the frequency band is a single sound source; and a multi-label classifier that inputs the inter-microphone phase difference calculated by the phase difference calculation unit and the single sound source mask calculated by the single sound source mask calculation unit as feature quantities, and outputs a direction label associated with a sound source direction to the feature quantities.

(2)

The sound source direction estimation device according to above (1), further including a conversion unit that converts the direction label output by the multi-label classifier into sound source direction information indicating a sound source direction.

(3)

The sound source direction estimation device according to above (1) or (2), in which the phase difference calculation unit and the single sound source mask calculation unit perform calculation on inputs from one microphone pair.

(4)

The sound source direction estimation device according to any one of above (1) to (3), in which the single sound source mask calculation unit generates a covariance matrix in a time-frequency domain from input signals of a predetermined time length from the microphone pair, obtains an eigenvalue of the covariance matrix, and takes as the single sound source mask a binary mask calculated by using as a mask value a binary value about whether or not a ratio of a minimum eigenvalue and a maximum eigenvalue is below a predetermined threshold value.

(5)

The sound source direction estimation device according to any one of above (1) to (3), in which the single sound source mask calculation unit calculates a covariance matrix in a time-frequency domain from an input signal of a predetermined time length from the microphone pair, obtains an eigenvalue of the covariance matrix, and takes as the single sound source mask a soft mask calculated by using as a mask value a value of zero or more and one or less calculated on the basis of a ratio of a minimum eigenvalue and a maximum eigenvalue.

(6)

The sound source direction estimation device according to any one of above (1) to (5), in which the multi-label classifier includes a same number of binary classifiers as a number of classifications of directions, each of the binary classifiers is associated with each direction, and when a feature quantity is input, zero or more binary classifiers corresponding to a direction in which a sound source exists output true values, and a direction label associated with the binary classifier that has output the true value is output as a sound source direction.

(7)

The sound source direction estimation device according to above (6), in which the multi-label classifier is a neural network and includes one input layer, one output layer, and one or more intermediate layers, the input layer includes a unit that inputs the inter-microphone phase difference for every frequency band and a unit that inputs the single sound source mask for every frequency band, the output layer includes a same number of classifications of units as a number of directions, and each of the units is associated with a different direction, data input to the input layer is propagated to the output layer, and only when a value of each of the units of the output layer exceeds a predetermined threshold value, the unit is considered to have output a true value, and a direction label associated with the unit that has output the true value is output as a sound source direction.

(8)

The sound source direction estimation device according to any one of above (1) to (5), in which the multi-label classifier includes a same number of classification classes as a total number of combinations of zero or more and M or less directions different from each other where M is an upper limit of a number of sound sources for which estimation is possible, each class is associated with zero or more sound source directions, when a feature quantity is input, the feature quantity is classified into one of the classes, and zero or more direction labels associated with the classified class are output as sound source directions.

(9)

The sound source direction estimation device according to above (8), in which the multi-label classifier is a neural network and includes one input layer, one output layer, and one or more intermediate layers, the input layer includes a unit that inputs the inter-microphone phase difference for every frequency band and a unit that inputs the single sound source mask for every frequency band, the output layer includes a same number of units as a total number of combinations of zero or more and M or less directions different from each other, each class is associated with zero or more sound source directions, data input to the input layer is propagated to the output layer, a unit that has a maximum value among units of the output layer is selected, and zero or more direction labels associated with the selected unit are output as sound source directions.

(10)

The sound source direction estimation device according to any one of above (1) to (9), in which the phase difference calculation unit and the single sound source mask calculation unit perform calculation on inputs from a plurality of microphone pairs.

(11)

The sound source direction estimation device according to above (10), in which at least two microphone pairs of the plurality of microphone pairs share one microphone of each of the microphone pairs.

(12)

The sound source direction estimation device according to above (4) or (5), in which the phase difference calculation unit calculates an argument of a complex number for an upper right or lower left element of the covariance matrix generated in calculation of the single sound source mask by the single sound source mask calculation unit, and takes a value thereof as the inter-microphone phase difference.

(13)

A sound source direction estimation method including, in an information processing device:

calculating an inter-microphone phase difference for every frequency band in a microphone pair including two microphones that are installed apart from each other by a predetermined distance;

calculating, for every frequency band in the microphone pair, a single sound source mask indicating whether or not a component of the frequency band is a single sound source; and inputting the calculated inter-microphone phase difference and the calculated single sound source mask as feature quantities to a multi-label classifier, and outputting a direction label associated with a sound source direction to the feature quantities.

(14)

A program that causes an information processing device to execute:

a process of calculating an inter-microphone phase difference for every frequency band in a microphone pair including two microphones that are installed apart from each other by a predetermined distance;

a process of calculating, for every frequency band in the microphone pair, a single sound source mask indicating whether or not a component of the frequency band is a single sound source; and a process of inputting the calculated inter-microphone phase difference and the calculated single sound source mask as feature quantities to a multi-label classifier, and outputting a direction label associated with a sound source direction to the feature quantities.

REFERENCE SIGNS LIST 1, 2, 3 Microphone
5 Sound source
6, 7 Transmission path
8 Path difference
74 Feature quantity extraction unit
76 Classification unit
77 Class-direction conversion unit
79 Control unit
83, 84 Short-time Fourier transform unit
85 Observed signal buffer unit
86 Inter-microphone phase difference calculation unit
87 Single sound source mask calculation unit

The invention claimed is:

1. A sound source direction estimation device, comprising:
a phase difference calculation unit that calculates an inter-microphone phase difference for every frequency band in a microphone pair including two microphones that are installed apart from each other by a predetermined distance;
a single sound source mask calculation unit that calculates, for every frequency band in the microphone pair, a single sound source mask indicating whether or not a component of the frequency band is a single sound source; and
a multi-label classifier that inputs the inter-microphone phase difference calculated by the phase difference calculation unit and the single sound source mask calculated by the single sound source mask calculation unit as feature quantities, and outputs a direction label associated with a sound source direction to the feature quantities.

2. The sound source direction estimation device according to claim 1, further comprising
a conversion unit that converts the direction label output by the multi-label classifier into sound source direction information indicating the sound source direction.

3. The sound source direction estimation device according to claim 1, wherein
the phase difference calculation unit and the single sound source mask calculation unit perform calculation on inputs from one microphone pair.

4. The sound source direction estimation device according to claim 1, wherein the single sound source mask calculation unit:
generates a covariance matrix in a time-frequency domain from input signals of a predetermined time length from the microphone pair, and
obtains an eigenvalue of the covariance matrix, and takes as the single sound source mask a binary mask calculated by using as a mask value a binary value about whether or not a ratio of a minimum eigenvalue and a maximum eigenvalue is below a predetermined threshold value.

5. The sound source direction estimation device according to claim 1, wherein the single sound source mask calculation unit:
calculates a covariance matrix in a time-frequency domain from an input signal of a predetermined time length from the microphone pair, obtains an eigenvalue of the covariance matrix, and
takes as the single sound source mask a soft mask calculated by using as a mask value a value of zero or more and one or less calculated on a basis of a ratio of a minimum eigenvalue and a maximum eigenvalue.

6. The sound source direction estimation device according to claim 1, wherein
the multi-label classifier includes a same number of binary classifiers as a number of classifications of directions, each of the binary classifiers is associated with each direction, and
when a feature quantity is input, zero or more binary classifiers corresponding to a direction in which a sound source exists output true values, and
a direction label associated with a binary classifier that has output a true value is output as the sound source direction.

7. The sound source direction estimation device according to claim 6, wherein
the multi-label classifier is a neural network and includes one input layer, one output layer, and one or more intermediate layers,
the input layer includes a unit that inputs the inter-microphone phase difference for every frequency band and a unit that inputs the single sound source mask for every frequency band,
the output layer includes a same number of units as the number of classifications of directions, and each of the units is associated with a different direction,
data input to the input layer is propagated to the output layer, and only when a value of each of the units of the output layer exceeds a predetermined threshold value, the unit is considered to have output a true value, and
a direction label associated with the unit that has output the true value is output as the sound source direction.

8. The sound source direction estimation device according to claim 1, wherein
the multi-label classifier includes a same number of classification classes as a total number of combinations of zero or more and M or less directions different from each other where M is an upper limit of a number of sound sources for which estimation is possible, each class is associated with zero or more sound source directions,
when a feature quantity is input, the feature quantity is classified into one of the classes, and
zero or more direction labels associated with a classified class are output as sound source directions.

9. The sound source direction estimation device according to claim 8, wherein
the multi-label classifier is a neural network and includes one input layer, one output layer, and one or more intermediate layers,
the input layer includes a unit that inputs the inter-microphone phase difference for every frequency band and a unit that inputs the single sound source mask for every frequency band,
the output layer includes a same number of units as a total number of combinations of zero or more and M or less directions different from each other, each class is associated with zero or more sound source directions,
data input to the input layer is propagated to the output layer, a unit that has a maximum value among units of the output layer is selected, and zero or more direction labels associated with a selected unit are output as sound source directions.

10. The sound source direction estimation device according to claim 1, wherein
the phase difference calculation unit and the single sound source mask calculation unit perform calculation on inputs from a plurality of microphone pairs.

11. The sound source direction estimation device according to claim 10, wherein at least two microphone pairs of the plurality of microphone pairs share one microphone of each of the plurality of microphone pairs.

12. The sound source direction estimation device according to claim 4, wherein
the phase difference calculation unit
calculates an argument of a complex number for an upper right or lower left element of the covariance matrix generated in calculation of the single sound source mask by the single sound source mask calculation unit, and takes a value thereof as the inter-microphone phase difference.

13. A sound source direction estimation method, comprising:
in an information processing device:
calculating an inter-microphone phase difference for every frequency band in a microphone pair including two microphones that are installed apart from each other by a predetermined distance;
calculating, for every frequency band in the microphone pair, a single sound source mask indicating whether or not a component of the frequency band is a single sound source; and
inputting the calculated inter-microphone phase difference and the calculated single sound source mask as feature quantities to a multi-label classifier, and outputting a direction label associated with a sound source direction to the feature quantities.

14. A non-transitory computer-readable medium having stored thereon, computer-executable instructions which, when executed by a processor, cause the processor to execute operations, the operations comprising:
a process of calculating an inter-microphone phase difference for every frequency band in a microphone pair including two microphones that are installed apart from each other by a predetermined distance;
a process of calculating, for every frequency band in the microphone pair, a single sound source mask indicating whether or not a component of the frequency band is a single sound source; and
a process of inputting the calculated inter-microphone phase difference and the calculated single sound source mask as feature quantities to a multi-label classifier, and outputting a direction label associated with a sound source direction to the feature quantities.

* * * * *